US007831749B2

(12) United States Patent
Pope et al.

(10) Patent No.: US 7,831,749 B2
(45) Date of Patent: *Nov. 9, 2010

(54) INCLUDING DESCRIPTOR QUEUE EMPTY EVENTS IN COMPLETION EVENTS

(75) Inventors: Steve Pope, Cambridge (GB); David Riddoch, Cambridge (GB); Ching Yu, Santa Clara, CA (US); Derek Roberts, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 493 days.

This patent is subject to a terminal disclaimer.

(21) Appl. No.: 11/050,474

(22) Filed: Feb. 3, 2005

(65) Prior Publication Data

US 2006/0173970 A1 Aug. 3, 2006

(51) Int. Cl.
*G06F 3/00* (2006.01)

(52) U.S. Cl. .................. 710/54; 710/3; 710/8; 710/15; 710/19; 710/20; 710/33; 710/52; 710/53; 710/57

(58) Field of Classification Search .................. 710/3, 710/8, 15, 19, 20, 33, 52, 53, 54, 57
See application file for complete search history.

(56) References Cited

U.S. PATENT DOCUMENTS

| | | | |
|---|---|---|---|
| 4,956,771 A * | 9/1990 | Neustaedter ................. | 710/52 |
| 5,740,467 A | 4/1998 | Chmielecki, Jr. et al. | |
| 5,745,790 A | 4/1998 | Oskouy | |
| 6,334,162 B1 | 12/2001 | Garrett et al. | |
| 6,393,457 B1 | 5/2002 | Allison et al. | |
| 6,397,316 B2 | 5/2002 | Fesas, Jr. | |
| 6,718,370 B1 | 4/2004 | Coffman et al. | |
| 6,988,268 B2 | 1/2006 | Zuberi | |
| 7,111,092 B1 * | 9/2006 | Mitten et al. ................. | 710/52 |
| 7,216,186 B2 * | 5/2007 | Richardson ................. | 710/53 |
| 7,363,389 B2 | 4/2008 | Collins et al. | |
| 7,404,190 B2 | 7/2008 | Krause et al. | |
| 2002/0144001 A1 | 10/2002 | Collins et al. | |
| 2003/0050990 A1 | 3/2003 | Craddock et al. | |
| 2003/0204552 A1 | 10/2003 | Zuberi | |
| 2004/0010594 A1 | 1/2004 | Boyd et al. | |
| 2004/0167992 A1 | 8/2004 | Carnevale et al. | |
| 2005/0138242 A1 | 6/2005 | Pope et al. | |
| 2005/0141434 A1 * | 6/2005 | Cornett ....................... | 370/252 |
| 2007/0214308 A1 | 9/2007 | Pope et al. | |

OTHER PUBLICATIONS

Riddoch, David et al.; "Distributed Computing With the CLAM Network"; Laboratory for Communications Engineering, Cambridge, England; SIGCOMM 2002.

(Continued)

*Primary Examiner*—Tariq Hafiz
*Assistant Examiner*—Jasjit S Vidwan
(74) *Attorney, Agent, or Firm*—Warren S. Wolfeld; Haynes Beffel & Wolfeld LLP

(57) ABSTRACT

Roughly described, method for managing data transmission between a host subsystem and a network interface device, in which the host writes data buffer descriptors into a DMA descriptor queue, and the network interface device writes completion events to notify the host when it has completed processing of data buffers. Each of the completion event descriptors notify the host of completion of data transfer between the NIC and one or more of the data buffers, and can also embed a queue empty notification inside the completion event.

15 Claims, 15 Drawing Sheets

OTHER PUBLICATIONS

Mansley, Kieran; "Engineering a User-Level TCP for the CLAN Network"; Laboratory for Communication Engineering, University of Cambridge, Cambridge, England; AGM SIGCOMM 2003 Workshops.

Pratt, Ian et al.; "Arsenic: A User-Accessible Gigabit Ethernet Interface"; Computer Laboratory, University of Cambridge, England; UK Engineering and Physical Sciences Research Councel (EPSRC). http://www.cl.cam.ac.uk/Research/SRG/netos/arsenic.html.

Mansley, Kieran, "Engineering a User-Level TCP for the Clan Network," Laboratory for Communications Engineering, University of Cambridge, Cambridge, England, Proceedings of the ACM SIGCOMM 2003 Workshops.

Compaq Computer Corp., Intel Corporation, Microsoft Corporation, "Virtual Interface Architecture Specification," Version 1.0, Dec. 16, 1997.

PCI Special Interest Group, "PCI-X Addendum to the PCI Local Bus Specification," Rev. 1.0a, Jul. 24, 2000.

Office Action mailed Nov. 1, 2007 in U.S. Appl. No. 11/050,483, filed Feb. 3, 2005.

Response A filed Mar. 3, 2008 in reply to Office Action mailed Nov. 1, 2007 in U.S. Appl. No. 11/050,483, filed Feb. 3, 2005.

Office Action mailed May 27, 2008 in U.S. Appl. No. 11/050,483, filed Feb. 3, 2005.

Response B filed Sep. 24, 2008 in reply to Office Action mailed May 27, 2008 in U.S. Appl. No. 11/050,483, filed Feb. 3, 2005.

Notice of Allowance mailed Apr. 27, 2009 in U.S. Appl. No. 11/050,483.

Gordon E. Moore; Electronics, vol. 38, No. 8, pp. 114-117, Apr. 19, 1965.

Jack B. Dennis and Earl C. Van Horn; Communications of the ACM, vol. 9, No. 3, pp. 143-155, Mar. 1966.

Marvin Zelkowitz; Communications of the ACM, vol. 14, No. 6, p. 417-418, Jun. 1971.

J. Carver Hill; Communications of the ACM, vol. 16, No. 6, p. 350-351, Jun. 1973.

F.F. Kuo; ACM Computer Communication Review, vol. 4 No. 1, Jan. 1974.

Vinton Cerf, Robert Kahn; IEEE Transactions on Communications, vol. COM-22, No. 5, pp. 637-648, May 1974.

V. Cerf, et al.; ACM Computer Communication Review, vol. 6 No. 1, p. 1-18, Jan. 1976.

Robert M. Metcalfe and David R. Boggs; Communications of the ACM, vol. 19, Issue 7, pp. 395-404, Jul. 1976.

P. Kermani and L. Kleinrock; Computer Networks, vol. 3, No. 4, pp. 267-286, Sep. 1979.

John M. McQuillan, et al.; Proceedings of the 6th Data Communications Symposium, p. 63, Nov. 1979.

Andrew D. Birrell, et al.; Communications of the ACM, vol. 25, Issue 4, pp. 260-274, Apr. 1982.

Ian M. Leslie, et al.; ACM Computer Communication Review, vol. 14, No. 2, pp. 2-9, Jun. 1984.

John Nagle; ACM Computer Communication Review, vol. 14, No. 4, p. 11-17, Oct. 1984.

Robert M. Brandriff, et al.; ACM Computer Communication Review, vol. 15, No. 4, Sep. 1985.

C. Kline; ACM Computer Communication Review, vol. 17, No. 5, Aug. 1987.

Christopher A. Kent, Jeffrey C. Mogul; ACM Computer Communication Review, vol. 17, No. 5, pp. 390-401, Oct. 1987.

Gary S. Delp, et al.; ACM Computer Communication Review, vol. 18, No. 4, p. 165-174, Aug. 1988.

David R. Boggs, et al.; ACM Computer Communication Review, vol. 18, No. 4, pp. 222-234, Aug. 1988.

H. Kanakia and D. Cheriton; ACM Computer Communication Review, vol. 18, No. 4, p. 175-187, Aug. 1988.

V. Jacobson; ACM Computer Communication Review, vol. 18, No. 4, p. 314-329, Aug. 1988.

David D. Clark; ACM Computer Communication Review, vol. 18, No. 4, pp. 106-114, Aug. 1988.

Paul V. Mockapetris, Kevin J. Dunlap; ACM Computer Communication Review, vol. 18, No. 4, pp. 123-133, Aug. 1988.

Margaret L. Simmons and Harvey J. Wasserman; Proceedings of the 1988 ACM/IEEE conference on Supercomputing, p. 288-295, Orlando, Florida, Nov. 12, 1988.

David A. Borman; ACM Computer Communication Review, vol. 19, No. 2, p. 11-15, Apr. 1989.

R. Braden, et al.; ACM Computer Communication Review, vol. 19, No. 2, p. 86-94, Apr. 1989.

David D. Clark, et al.; IEEE Communications Magazine, vol. 27, No. 6, pp. 23-29, Jun. 1989.

David R. Cheriton; ACM Computer Communication Review, vol. 19, No. 4, p. 158-169, Sep. 1989.

Derek Robert McAuley; PhD Thesis, University of Cambridge, Sep. 1989.

Craig Partridge; ACM Computer Communication Review, vol. 20, No. 1, p. 44-53, Jan. 1990.

D. D. Clark and D. L. Tennenhouse; ACM Computer Communication Review, vol. 20, No. 4, pp. 200-208, Sep. 1990.

Eric C. Cooper, et al.; ACM Computer Communication Review, vol. 20, No. 4, p. 135-144, Sep. 1990.

Bruce S. Davie; ACM Computer Communication Review, vol. 21, No. 4, Sep. 1991.

C. Brendan S. Traw, et al.; ACM Computer Communication Review, vol. 21, No. 4, p. 317-325, Sep. 1991.

Ian Leslie and Derek R. McAuley; ACM Computer Communication Review, vol. 21, No. 4, p. 327, Sep. 1991.

Mark Hayter, Derek McAuley; ACM Operating Systems Review, vol. 25, Issue 4, p. 14-21, Oct. 1991.

Gregory G. Finn; ACM Computer Communication Review, vol. 21, No. 5, p. 18-29, Oct. 1991.

Greg Chesson; Proceedings of the Third International Conference on High Speed Networking, Nov. 1991.

Michael J. Dixon; University of Cambridge Computer Laboratory Technical Report No. 245, Jan. 1992.

Danny Cohen, Gregory Finn, Robert Felderman, Annette DeSchon; Made available by authors, Jan. 10, 1992.

Gene Tsudik; ACM Computer Communication Review, vol. 22, No. 5, pp. 29-38, Oct. 1992.

Peter Steenkiste; ACM Computer Communication Review, vol. 22, No. 4, Oct. 1992.

Paul E. McKenney and Ken F. Dove; ACM Computer Communication Review, vol. 22, No. 4, Oct. 1992.

Erich Ruetsche and Matthias Kaiserswerth; Proceedings of the IFIP TC6/WG6.4 Fourth International Conference on High Performance Networking IV, Dec. 14, 1992.

C. Traw and J. Smith; IEEE Journal on Selected Areas in Communications, pp. 240-253, Feb. 1993.

E. Ruetsche; ACM Computer Communication Review, vol. 23, No. 3, Jul. 1993.

Jonathan M. Smith and C. Brendan S. Traw; IEEE Network, vol. 7, Issue 4, pp. 44-52, Jul. 1993.

Jeffrey R. Michel; MSci Thesis, University of Virginia, Aug. 1993.

Mark David Hayter; PhD Thesis, University of Cambridge, Sep. 1993.

Jonathan Kay and Joseph Pasquale; ACM Computer Communication Review, vol. 23, No. 4, pp. 259-268, Oct. 1993.

W. E. Leland, et al.; ACM Computer Communication Review, vol. 23, No. 4, p. 85-95, Oct. 1993.

C. A. Thekkath, et al.; ACM Computer Communication Review, vol. 23, No. 4, Oct. 1993.

Raj K. Singh, et al.; Proceedings of the 1993 ACM/IEEE conference on Supercomputing, p. 452-461, Portland, Oregon, Nov. 15, 1993.

Peter Druschel and Larry L. Peterson; ACM Operating Systems Review, vol. 27, Issue 5, p. 189-202, Dec. 1993.

Matthias Kaiserswerth; IEEE/ACM Transactions on Networking, vol. 1, No. 6, p. 650-663, Dec. 1993.

Chris Maeda, Brian Bershad; ACM Operating Systems Review, vol. 27, Issue 5, p. 244-255, Dec. 1993.

Greg Regnier, et al.; IEEE Micro, vol. 24, No. 1, p. 24-31, Jan. 1994.

J. Vis; ACM Computer Communication Review, vol. 24, No. 1, pp. 7-11, Jan. 1994.

Danny Cohen, Gregory Finn, Robert Felderman, Annette DeSchon; Journal of High Speed Networks, Jan. 3, 1994.

Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.

M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, 2001, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.

Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference Jan. 1996.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.
Patrick Geoffray; HPCWire article: http://www.hpcwire.com/features/17886984.html, Aug. 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, Apr. 22, 2001.
M.V. Wilkes and R.M. Needham; ACM SIGOPS Operating Systems Review, vol. 14, Issue 1, pp. 21-29, Jan. 1980.
Dickman, L. "Protocol OffLoading vs OnLoading in High Performance Networks," 14th Symposium on High Performance Interconnects, Aug. 23, 2006, 8pp.
Mogul J., "TCP offload is a dumb idea whose time has com," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.

* cited by examiner

INCLUDING DESCRIPTOR QUEUE EMPTY EVENTS IN COMPLETION EVENTS

BACKGROUND

1. Field of the Invention

The invention relates to network interfaces, and more particularly to queue-based network transmit and receive mechanisms that maximize performance.

2. Description of Related Art

When data is to be transferred between two devices over a data channel, such as a network, each of the devices must have a suitable network interface to allow it to communicate across the channel. Often the network is based on Ethernet technology. Devices that are to communicate over a network are equipped with network interfaces that are capable of supporting the physical and logical requirements of the network protocol. The physical hardware component of network interfaces are referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

Most computer systems include an operating system (OS) through which user level applications communicate with the network. A portion of the operating system, known as the kernel, includes protocol stacks for translating commands and data between the applications and a device driver specific to the NIC, and the device drivers for directly controlling the NIC. By providing these functions in the operating system kernel, the complexities of and differences among NICs can be hidden from the user level application. In addition, the network hardware and other system resources (such as memory) can be safely shared by many applications and the system can be secured against faulty or malicious applications.

In the operation of a typical kernel stack system a hardware network interface card interfaces between a network and the kernel. In the kernel a device driver layer communicates directly with the NIC, and a protocol layer communicates with the system's application level.

The NIC stores pointers to buffers in host memory for incoming data supplied to the kernel and outgoing data to be applied to the network. These are termed the RX data ring and the TX data ring. The NIC updates a buffer pointer indicating the next data on the RX buffer ring to be read by the kernel. The TX data ring is supplied by direct memory access (DMA) and the NIC updates a buffer pointer indicating the outgoing data which has been transmitted. The NIC can signal to the kernel using interrupts.

Incoming data is picked off the RX data ring by the kernel and is processed in turn. Out of band data is usually processed by the kernel itself. Data that is to go to an application-specific port is added by pointer to a buffer queue, specific to that port, which resides in the kernel's private address space.

The following steps occur during operation of the system for data reception:

1. During system initialization the operating system device driver creates kernel buffers and initializes the RX ring of the NIC to point to these buffers. The OS also is informed of its IP host address from configuration scripts.
2. An application wishes to receive network packets and typically creates a socket, bound to a Port, which is a queue-like data structure residing within the operating system. The port has a number which is unique within the host for a given network protocol in such a way that network packets addressed to <host:port> can be delivered to the correct port's queue.
3. A packet arrives at the network interface card (NIC). The NIC copies the packet over the host I/O bus (e.g. a PCI bus) to the memory address pointed to by the next valid RX DMA ring Pointer value.
4. Either if there are no remaining DMA pointers available, or on a pre-specified timeout, the NIC asserts the I/O bus interrupt in order to notify the host that data has been delivered.
5. In response to the interrupt, the device driver examines the buffer delivered and if it contains valid address information, such as a valid host address, passes a pointer to the buffer to the appropriate protocol stack (e.g. TCP/IP). In some systems the device driver is able to switch to polling for a limited period of time in order to attempt to reduce the number of interrupts.
6. The protocol stack determines whether a valid destination port exists and if so, performs network protocol processing (e.g. generate an acknowledgment for the received data) and enqueues the packet on the port's queue.
7. The OS may indicate to the application (e.g. by rescheduling and setting bits in a "select" bit mask) that a packet has arrived on the network end point to which the port is bound (by marking the application as runnable and invoking a scheduler).
8. The application requests data from the OS, e.g. by performing a recv( ) system call (supplying the address and size of a buffer) and while in the OS kernel, data is copied from the kernel buffer into the application's buffer. On return from the system call, the application may access the data from the application buffer.
9. After the copy (which usually takes place in the context of a soft interrupt), the kernel will return the kernel buffer to an OS pool of free memory. Also, during the interrupt the device driver allocates a new buffer and adds a pointer to the DMA ring. In this manner there is a circulation of buffers from the free pool to an application's port queue and back again.
10. Typically the kernel buffers are located in physical RAM and are never paged out by the virtual memory (VM) system. However, the free pool may be shared as a common resource for all applications.

For data transmission, the following steps occur.

1. The operating system device driver creates kernel buffers for use for transmission and initializes the TX ring of the NIC.
2. An application that is to transmit data stores that data in an application buffer and requests transmission by the OS, e.g. by performing a send( ) system call (supplying the address and size of the application buffer).
3. In response to the send( ) call, the OS kernel copies the data from the application buffer into the kernel buffer and applies the appropriate protocol stack (e.g. TCP/IP).
4. A pointer to the kernel buffer containing the data is placed in the next free slot on the TX ring. If no slot is available, the buffer is queued in the kernel until the NIC indicates e.g. by interrupt that a slot has become available.
5. When the slot comes to be processed by the NIC it accesses the kernel buffer indicated by the contents of the slot by DMA cycles over the host I/O bus and then transmits the data.

It has been recognized in the past that both the transmit and receive operations can involve excessive data movement.

Some solutions have been proposed for reducing the performance degradation caused by such data movement. See, for example, U.S. Pat. No. 6,246,683, incorporated by reference herein. In PCT International Publication No. WO 2004/025477 A2, incorporated by reference herein, it was further recognized that both the transmit and receive operations can involve excessive context switching, which also causes significant overhead. Techniques are described therein for reducing the number of context switches required.

Among the mechanisms described therein is the use of event queues for communicating control information between the host system and the NIC. When a network interface device is attached to a host system via an I/O bus, such as via a PCI bus, there is a need for frequent communication of control information between the processor and NIC. Typically control communication is initiated by an interrupt issued by the NIC, which causes a context switch. In addition, the communication often requires the host system to read or write the control information from or to the NIC via the PCI bus, and this can cause bus bottlenecks. The problem is especially severe in networking environments where data packets are often short, causing the amount of required control work to be large as a percentage of the overall network processing work.

In the embodiment described in the PCT publication, a "port" is considered to be an operating system specific entity which is bound to an application, has an address code, and can receive messages. One or more incoming messages that are addressed to a port form a message queue, which is handled by the operating system. The operating system has previously stored a binding between that port and an application running on the operating system. Messages in the message queue for a port are processed by the operating system and provided by the operating system to the application to which that port is bound. The operating system can store multiple bindings of ports to applications so that incoming messages, by specifying the appropriate port, can be applied to the appropriate application. The port exists within the operating system so that messages can be received and securely handled no matter what the state of the corresponding application.

At the beginning of its operations, the operating system creates a queue to handle out of band messages. This queue may be written to by the NIC and may have an interrupt associated with it. When an application binds to a port, the operating system creates the port and associates it with the application. It also creates a queue (an event queue) to handle out of band messages for that port only. That out of band message queue for the port is then memory mapped into the application's virtual address space such that it may de-queue events without requiring a kernel context switch.

The event queues are registered with the NIC, and there is a control block on the NIC associated with each queue (and mapped into either or both the OS or application's address space(s)).

A queue with control blocks as described in the PCT publication is illustrated in FIG. 1. In the described implementation, the NIC 161 is connected into the host system via a PCI bus 110. The event queue 159 is stored in host memory 160, to which the NIC 161 has access. Associated with the event queue 159 are a read pointer (RDPTR) 162a and a write pointer (WRPTR) 163a, which indicate the points in the queue at which data is to be read and written next. Pointer 162a is stored in host memory 160. Pointer 163a is stored in NIC 161. Mapped copies of the pointers RDPTR' 162b and WPTR' 163b are stored in the other of the NIC and the memory than the original pointers. In the operation of the system:

1. The NIC 161 can determine the space available for writing into event queue 159 by comparing RDPTR' and WRPTR, which it stores locally.
2. NIC 161 generates out of band data and writes it to the queue 159.
3. The NIC 161 updates WRPTR and WRPTR' when the data has been written, so that the next data will be written after the last data.
4. The application determines the space available for reading by comparing RDPTR and WRPTR' as accessed from memory 160.
5. The application reads the out of band data from queue 159 and processes the messages.
6. The application updates RDPTR and RDPTR'.
7. If the application requires an interrupt, then it (or the operating system on its behalf) sets the IRQ 165a and IRQ' 165b bits of the control block 164. The control block is stored in host memory 160 and is mapped onto corresponding storage in the NIC. If set, then the NIC would also generate an interrupt on step 3 above.

The event queue mechanism helps improve performance by frequently allowing applications and the OS to poll for new events while they already have context; context switching is reduced by generating interrupts only when required. Bus bottlenecks are also reduced since the host system can retrieve control information more often from the events now in the event queue in host memory, rather than from the NIC directly via the PCI bus.

The use of event queues do not completely eliminate control traffic on an I/O bus. In particular, the NIC still needs to generate events for notifying the host system that the NIC has completed its processing of a transmit data buffer and that the data buffer can now be released for re-use. It also needs to generate events for notifying the host system that the NIC has completed filling a receive data buffer and that the receive data buffer can now be processed by the host.

In certain systems the NIC may also generate other events for notifying the host of other status conditions. In certain kinds of systems, for example, queues might be left unserviced for a long period of time. This might be the case in systems that manage a large number of queues. In such systems it would be desirable for the NIC to be able to also generate events indicating descriptor queue empty conditions. The NIC might assert a descriptor queue empty event whenever the NIC attempts to retrieve a new transmit or receive descriptor from the corresponding queue, but finds that queue empty. The host may respond by taking exceptional measures to enqueue additional descriptors.

Each event descriptor undesirably occupies time on the I/O bus. In addition, the handling of events by the host system continues to require some processor time, which increases as the number of events increases. A larger number of events may also cause a larger number of interrupts, which will further degrade host performance.

In accordance with an aspect of the invention, roughly described, it has been recognized that on transmit, the emptying of a transmit DMA descriptor queue always coincides with completion of a transmit operation (although the reverse is not necessarily true). Instead of entering into the event queue both a completion notification and a transmit DMA descriptor queue empty notification, therefore, a NIC enters only one event, embedding the queue empty notification inside the transmit operation completion event.

Similarly on receive, in an embodiment in which some incoming packet data is lost if an insufficient number of receive data buffers are identified in the receive DMA descriptor queue, a receive packet completion notification will be issued whenever the receive DMA descriptor queue has been emptied. That is, the NIC notifies the host of receive packet completion if the receive DMA descriptor queue is empty, even if not enough space was provided in receive data buffers to hold all the data of the packet. As with transmit, therefore, instead of entering into the event queue both a completion notification and a receive DMA descriptor queue empty notification, a NIC enters only one event, embedding the queue empty notification inside the receive operation completion event.

By combining of the descriptor queue empty notification into a single event with the transmit or receive completion event, usage of the I/O bus is optimized.

The combination has an added benefit as well, in that it allows the NIC to notify the host of the queue empty condition when the last descriptor is being used rather than afterwards, when the queue is already empty. This benefit is especially significant on receive, because it reduces the likelihood of losing incoming packet data.

In embodiments having multiple descriptor queues, or having a very large descriptor queue, it is preferable that the descriptor queues be maintained in host memory rather than in the NIC, where memory is relatively more expensive. In such a system, whereas the application might write additional descriptors onto the descriptor queue in response to completion events received from the NIC, it might reduce control traffic on the bus by refraining from notifying the NIC of the host's updated descriptor queue write pointer until it receives a queue empty notification. But since a queue empty notification conventionally would occupy its own time on the bus, optimal bus usage would require the host to try to guess when the NIC is about to find the queue empty and then write the updated descriptor queue write pointer just before then. Such a guess is never perfect, so in some cases the host will write the updated descriptor queue write pointer earlier than it needs to (i.e. writing such pointers more frequently than it needs to), and in other cases the host will delay too long, thereby incurring the undesirable bus usage time of the NIC's queue empty notification. On the other hand, by embedding the queue empty notification inside the receive operation completion event, they essentially occupy no additional time on the bus. The host can therefore always await the queue empty notification before writing the updated descriptor queue write pointer into the NIC, without risking the undesirable bus usage time of a queue empty notification. In another embodiment, a similar result can be achieved by embedding the host's updated descriptor queue write pointer either explicitly or implicitly into the descriptors in the descriptor queue, or at least in many of such descriptors. The NIC then receives the updated pointer in every descriptor, or at least in many descriptors, thereby reducing the number of queue empty events it will signal. This latter mechanism can be included in the same embodiment as the former.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 2:
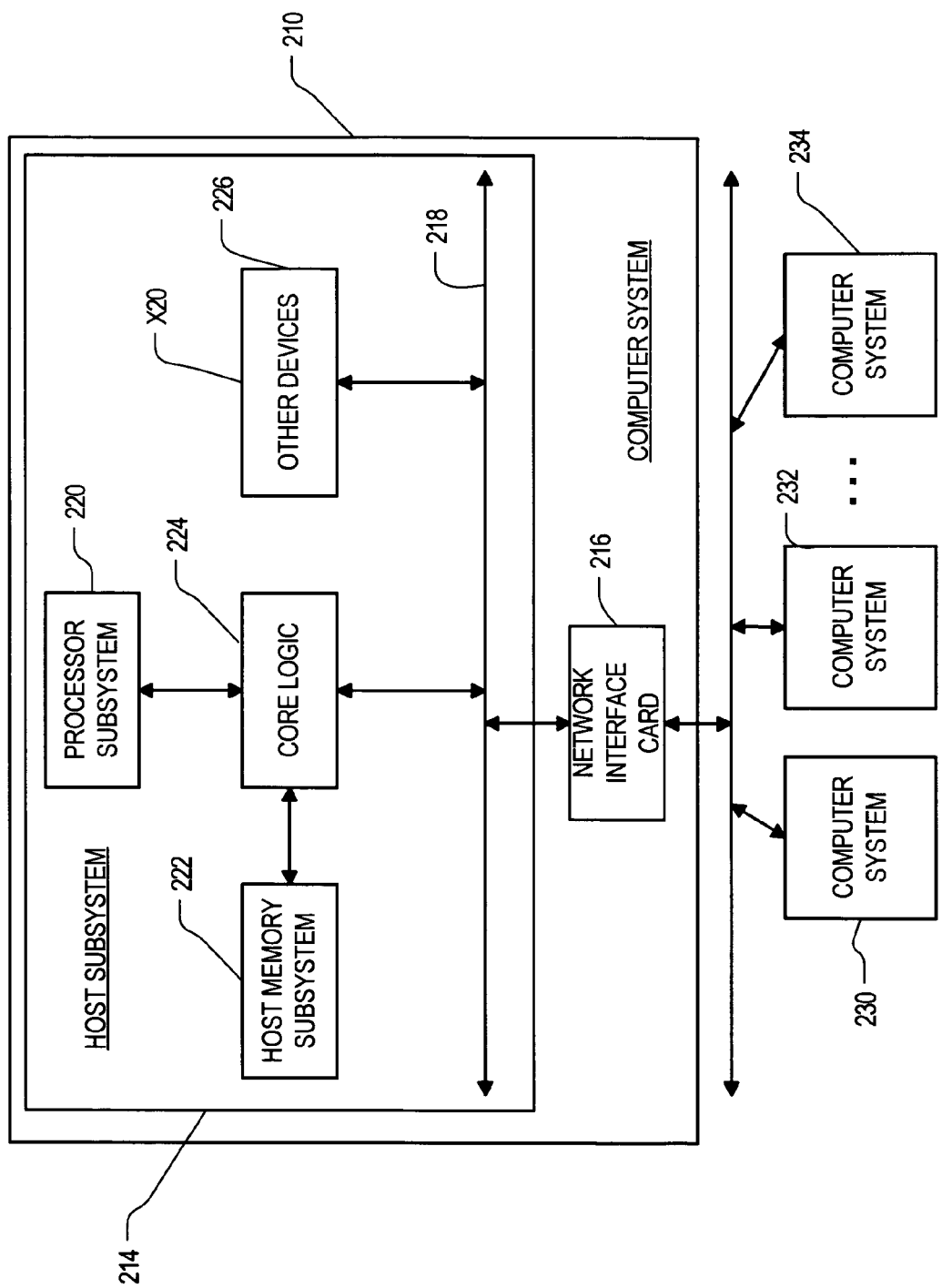
FIG. 2 is a simplified block diagram of a typical computer system incorporating features of the invention.

FIG. 2 is a simplified block diagram of a typical computer system 210 which can communicate via a network 212 with other computer systems such as 230, 232 and 234. Computer system 210 includes a network interface card (NIC) 216 communicating via a communication channel 218 with a host subsystem 214. The host subsystem 224 includes a processor subsystem 220 which includes at least one processor, a host memory subsystem 222, and a core logic subsystem 224. The core logic subsystem 224 provides bridges among the processor subsystem 220, the host memory subsystem 222 and the communication channel 218. The host subsystem 214 may also include other devices 226 in communication with the communication channel 218.

The network interface card 216 provides an interface to outside networks, including an interface to the network 212, and is coupled via network 212 to corresponding interface devices in other computer systems. Network 218 may comprise many interconnected computer systems and communication links. These communication links may be wireline links, optical links, wireless links or any other mechanism for communication of information. While in one embodiment network 218 is the Internet, in other embodiments, network 218 may be any suitable computer network or combination of networks. In and embodiment described herein, network 218 supports an Ethernet protocol.

Host memory subsystem 222 typically includes a number of memories including a main random access memory (RAM) for storage of instructions and data during program execution, and a read only memory (ROM) in which fixed instructions and data are stored. One or more levels of cache memory may also be included in the host memory subsystem 222. For simplicity of discussion, the host memory subsystem 222 is sometimes referred to herein simply as "host memory".

The communication channel 218 provides a mechanism for allowing the various components and subsystems of computer system 210 to communicate with each other. In one embodiment the communication channel 218 comprises a PCI bus. Other embodiments may include other buses, and may also include multiple buses.

Figure 1:
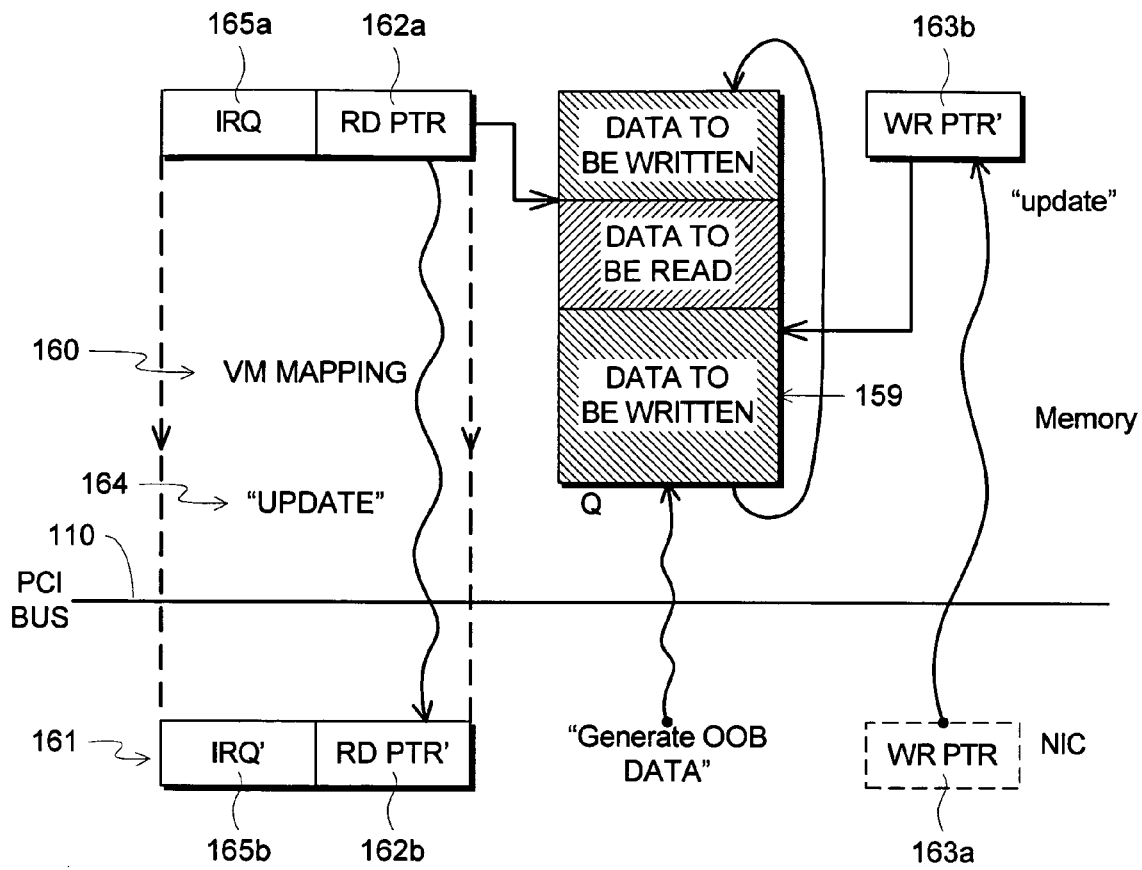
FIG. 1 is a block diagram of a queue with control blocks as described in PCT International Publication No. WO 2004/025477 A2.

Computer system 210 itself can be a varying types including a personal computer, a portable computer, a workstation, a computer terminal, a network computer, a television, a mainframe, a server or any other data processing system or user devices. Due to the ever-changing nature of computers and networks, the description of computer system 210 depicted in FIG. 1 is intended only as a specific example for purposes of illustrating an embodiment of the present invention. Many other configurations of computer system 210 are possible having more or less components, and configured similarly or differently than, the computer system depicted in FIG. 1.

Data Structures, Simplified Embodiment

Figure 3:
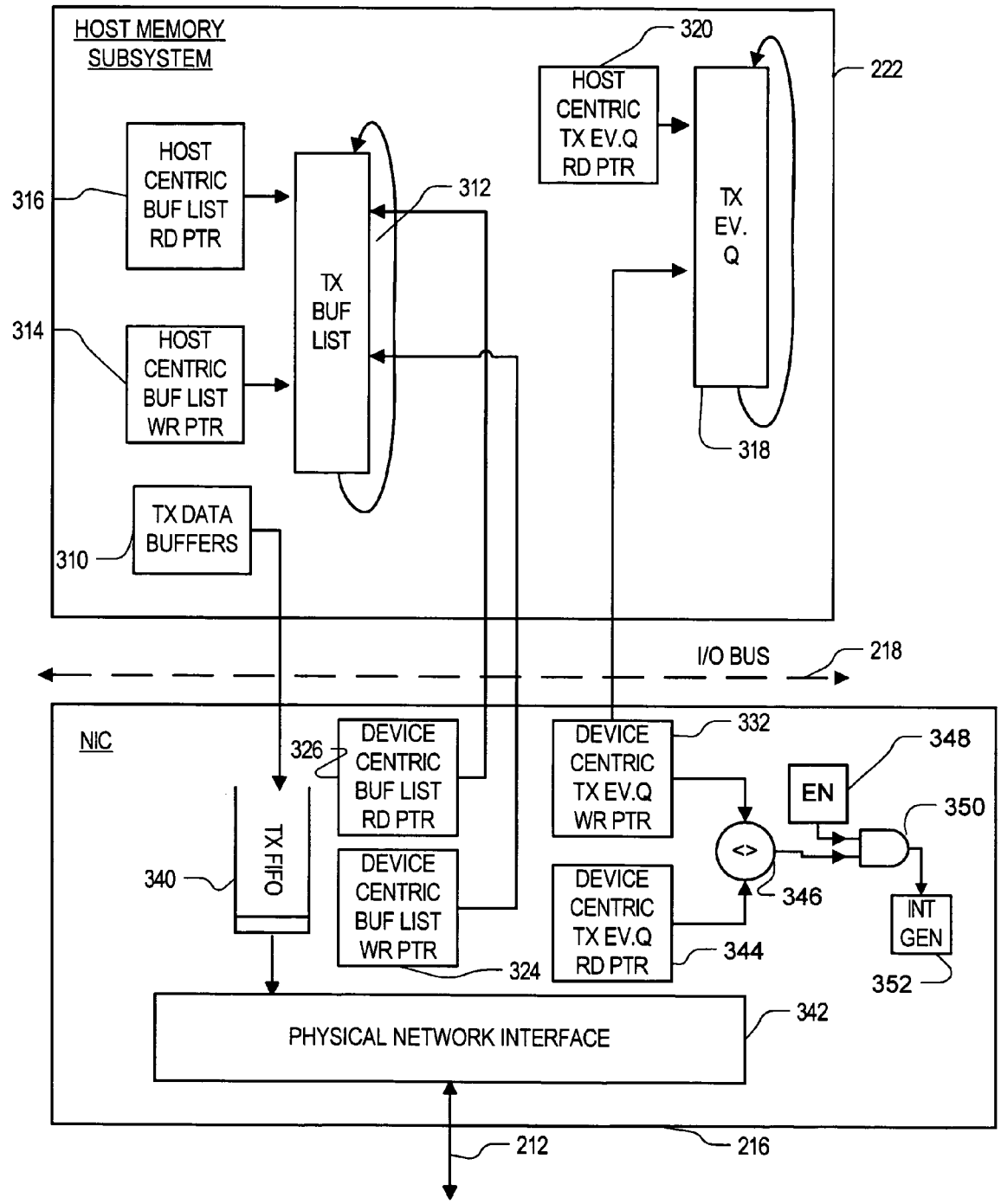
FIG. 3 illustrates a simplified embodiment of a transmit queue according to the invention.
Figure 4:
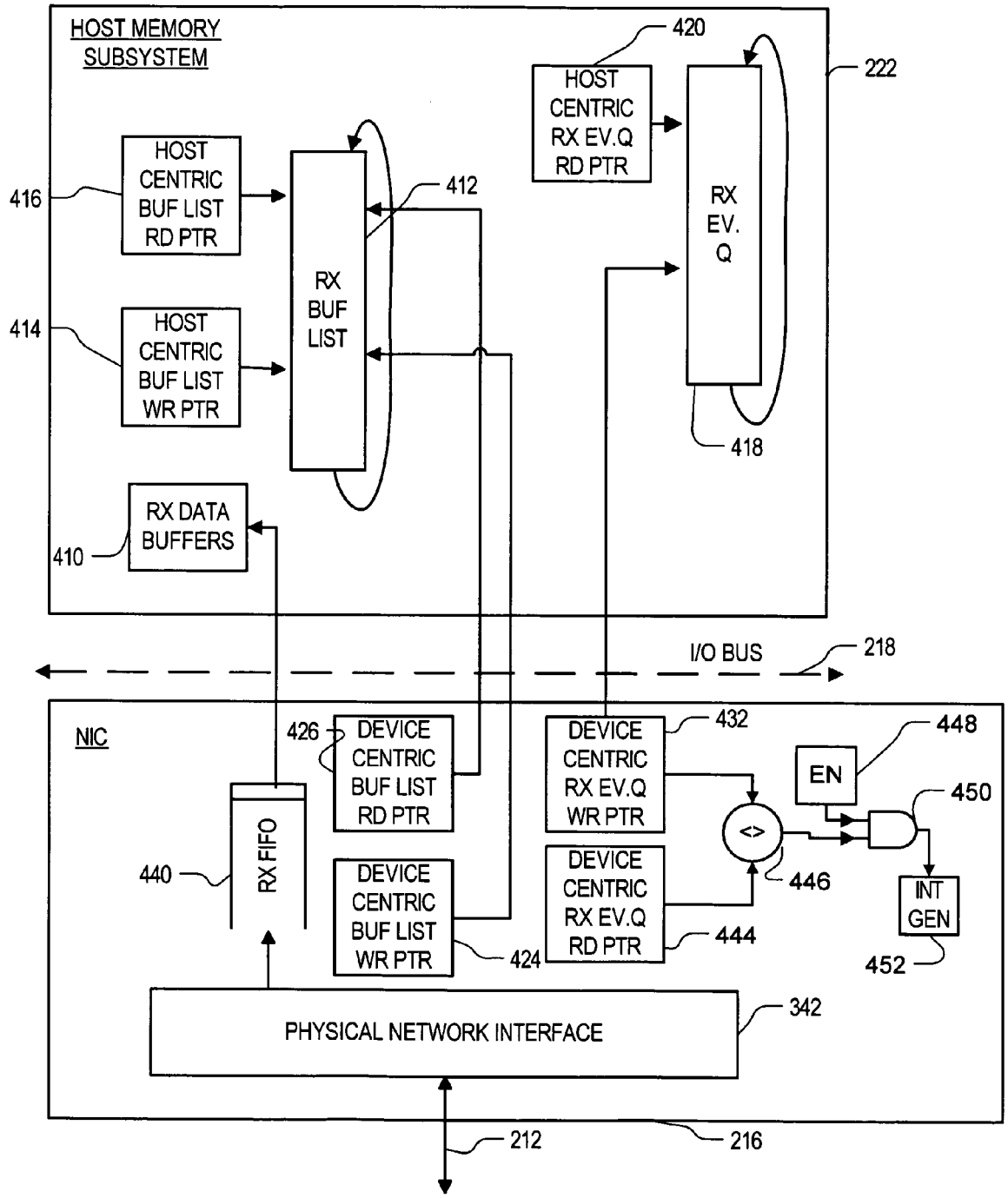
FIG. 4 illustrates a simplified embodiment of a receive queue according to the invention.

FIGS. 3 and 4 illustrate simplified embodiments of the invention, incorporated into the computer system 210 of FIG. 2. In the embodiment of FIG. 3, only a single transmit queue with associated structures is shown, and in the embodiment of FIG. 4, only a single receive queue with associated structures is shown. Both transmit and receive queues are included in a typical implementation, but aspects of the invention can be implemented independently in each. FIGS. 3 and 4 show only the host memory subsystem 222 and the network interface card 216, and only the structures within such components that are pertinent to the present discussion.

Referring first to FIG. 3, the transmit queue is stored in host memory 222 in a series of transmit data buffers 310. The transmit data buffers can be discontiguous within host memory 222, and they are linked together by means of a transmit buffer list 312. The host subsystem 214 writes transmit data buffer descriptors into the transmit buffer list 312 at locations pointed to by a buffer list write pointer 314 in host memory 222, and the NIC 216 reads transmit buffer descriptors from the transmit buffer list 312 at locations pointed to by buffer list read pointer 326 on the NIC 216, corresponding to buffer list read pointer 316 in host memory 222. The transmit buffer list 312 is a "wrap-around" list, meaning that a pointer that consecutively increments beyond the end of the list automatically wraps around to the beginning in a ring-like fashion. If the list has N entries, for example, it can be said that the read and write pointers increment "modulo N". It can also be said that the pointers "modulo increment", the length of the list being implied.

Also associated with the transmit buffer list 312 and the transmit data buffers 310 is a transmit event queue 318, which is also a wrap-around structure. Events are written into the transmit event queue 318 at locations identified by a transmit event queue write pointer 332 on the NIC 216, and are read from the transmit event queue by the host subsystem 214 at locations identified by a transmit event queue read pointer 320 in host memory 222. The system of FIG. 2 uses events as the hardware status reporting method whenever possible, rather than interrupts. In order to improve event delivery latency and overall bus efficiency, events are written out by the NIC 216 into host memory 222 instead of being read by the host subsystem 214 from locations in the NIC 216.

The read and write pointers 314 and 316 into the transmit buffer list 312 are referred to herein as being "host centric", because they represent the state of the queue as viewed by the host subsystem 214. In various embodiments, the host subsystem 214 can compare these pointers in order to detect queue overflow conditions, queue full conditions, or queue high or low watermark conditions, depending on what's needed in the embodiment for queue depth management. The NIC 216 also maintains read and write pointers 324 and 326, respectively, into the transmit data queue 310, as described hereinafter. The read and write pointers 324 and 326 on the NIC are referred to as "device centric" pointers because they represent the state of the queue as viewed by the NIC device 216. In conventional fashion, the host subsystem uses its host centric buffer list write pointer 314 to write into the transmit buffer list 312, modulo-increments the host centric buffer list write pointer 314 after writing, and notifies the NIC to update its device centric buffer list write pointer 324. Similarly, the NIC uses its device centric buffer list read pointer 326 to read from the transmit buffer list 312, modulo-increments the device centric buffer list read pointer 326 after reading, and notifies the host subsystem 214 to update its host centric buffer list read pointer 316. Thus whereas efforts are made to synchronize the host centric buffer list read pointer with the device centric buffer list read pointer, and the host centric buffer list write pointer with the device centric buffer list write pointer, certain points in time may exist during which two pointers in each pair do not exactly match. Importantly, in this simplified embodiment the host subsystem 214 does not maintain a host-centric copy of the transmit event queue write pointer 332. The NIC 216 does maintain a device-centric copy 344 of the transmit event queue read pointer 320, but it is not used for event queue depth management. Instead, it is used for managing the generation of interrupts to the host subsystem to activate a transmit event handler as described in more detail hereinafter.

The NIC 216 further includes a comparator 346 which compares the value in device centric transmit event queue write pointer 332 with the value in device centric transmit event queue read pointer 344. When the two values are unequal, the output of comparator 346 is active. The NIC 216 also includes an interrupt enable register bit 348, and logic 350 which triggers an interrupt generator 352 when both the interrupt enable register bit 348 and the comparator 346 output are active. The operation of the interrupt generation components is described hereinafter.

The NIC 216, in addition to the components already mentioned, also maintains a transmit FIFO 340 into which it writes transmit data that it retrieves from the transmit data buffers 310. Data output from the transmit FIFO 340 is driven onto the network 212 by a physical network interface (PHY) 342.

The network interface card 216 communicates with the host memory 222 via (among other things) an I/O bus 218. I/O bus 218 is preferably a PCI bus, and more preferably the version of PCI known as PCI express. PCI express is described in PCI Special Interest Group, "PCI Express Base Specification 1.0a", Apr. 15, 2003, incorporated herein by reference. Most data (including transmit data from transmit data buffers 310) are communicated via the 1/0 bus 218 using a direct memory access (DMA) protocol through the core logic subsystem 224, although some communication between the host subsystem 214 and the NIC 216 can involve the processor subsystem 220.

Referring now to FIG. 4, like the transmit queue, the receive queue is stored in host memory 222 in a series of receive data buffers 410. The receive data buffers are linked together by means of a wrap-around receive buffer list 412. When the host subsystem 214 wishes to make additional buffers available for accepting receive data, it writes identifications of the new receive data buffers into the receive buffer list 412 at locations pointed to by a host centric buffer list write pointer 414 in host memory 222. The NIC 216 reads receive buffer descriptors from the receive buffer list 412 at locations pointed to by device centric buffer list read pointer 426 on the NIC 216, corresponding to a host centric buffer list read pointer 416 in host memory 222.

Also associated with the receive buffer list 412 and the receive data buffers 410 is a wrap-around receive event queue 418. Events are written into the receive event queue 418 at locations identified by a receive event queue write pointer 432 on the NIC 216, and are read from the receive event queue 418 at locations identified by a receive event queue read pointer 420 in host memory. As with the transmit event queue read and write pointers 222, in conventional fashion, the host subsystem uses its host centric buffer list write pointer 414 to write into the receive buffer list 412, modulo-increments the host centric buffer list write pointer 414 after writing, and notifies the NIC to update its device centric buffer list write pointer 424. Similarly, the NIC uses its device centric buffer list read pointer 426 to read from the receive buffer list 412, modulo-increments the device centric buffer list read pointer 426 after reading, and notifies the host subsystem 214 to update its host centric buffer list read pointer 416. Importantly, in this simplified embodiment the host subsystem 214 does not maintain a host-centric copy of the receive event queue write pointer 432. As on the transmit side, the NIC 216 does maintain a device-centric copy 444 of the receive event queue read pointer 420, but it is used for managing the generation of interrupts to the host subsystem to activate a receive event handler, instead of for event queue depth management.

The NIC 216 further includes a comparator 446 which compares the value in device centric receive event queue write pointer 432 with the value in device centric receive event queue read pointer 444. When the two values are unequal, the output of comparator 446 is active. The NIC 216 also includes an interrupt enable register bit 448, and logic 450 which triggers an interrupt generator 452 when both the interrupt enable register bit 448 and the comparator 446 output are active.

The NIC 216, in addition to the transmit apparatus of FIG. 3, and the receive side components described above, also maintains a receive FIFO 440 into which it writes data received from the PHY 342. The NIC 216 writes data output from the receive FIFO 440 into the receive data buffers 410 in accordance with the current entry of the receive buffer list 412.

Transmit Queue Operation, Simplified Embodiment

Figure 5:
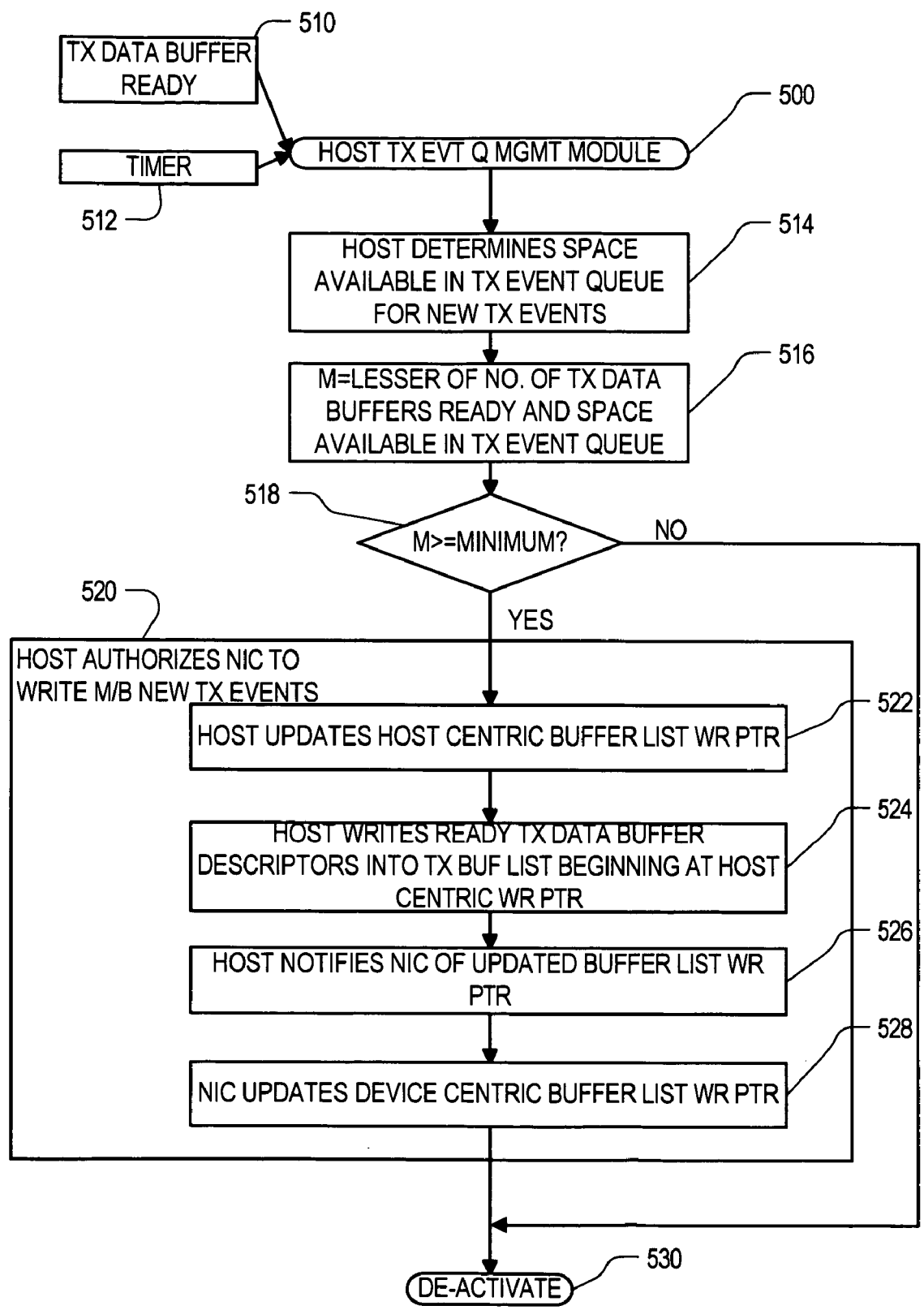
FIGS. 5, 6 and 7 are flowcharts illustrating functions that take place using the structures of FIG. 3.
Figure 6:
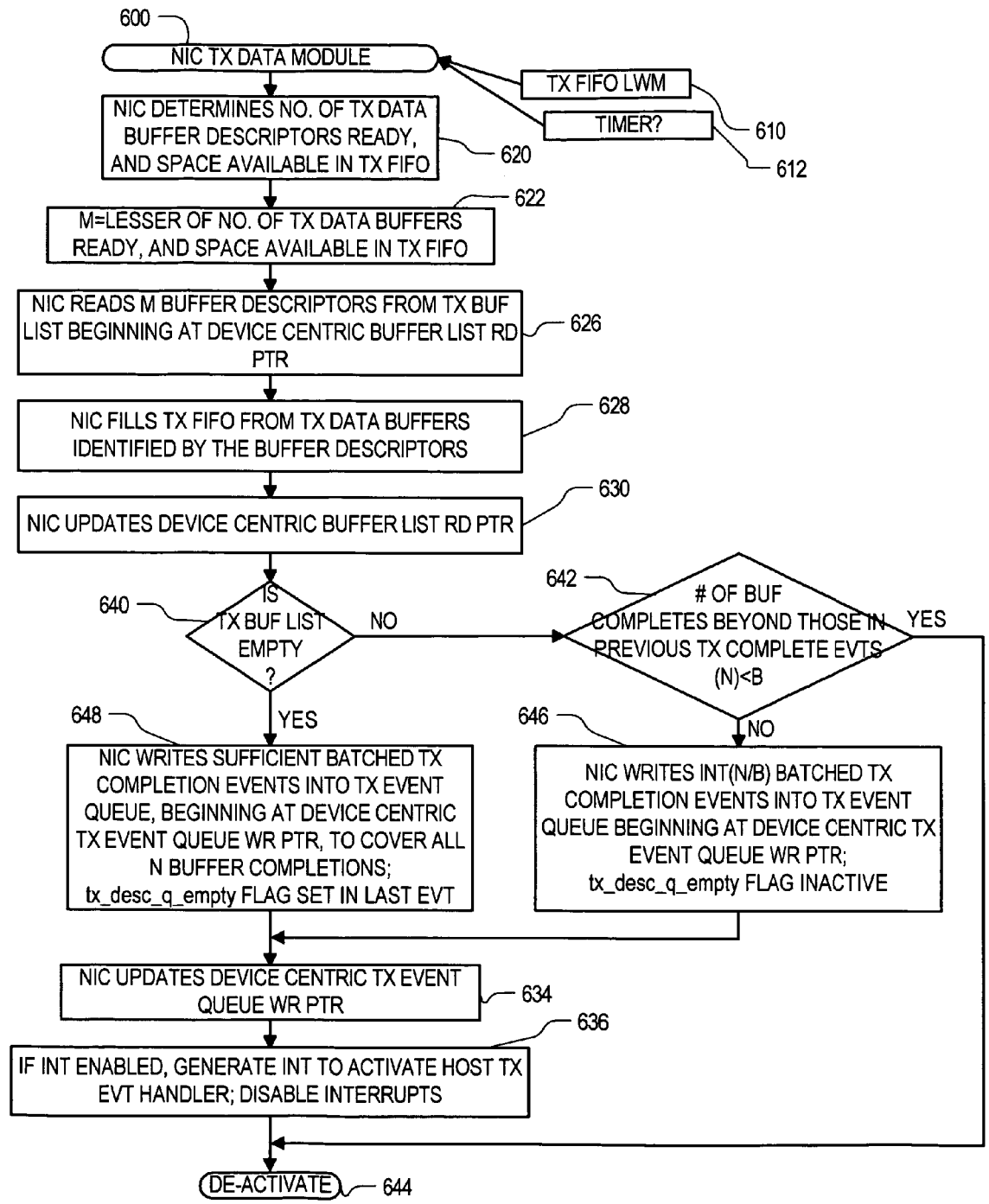
Figure 7:
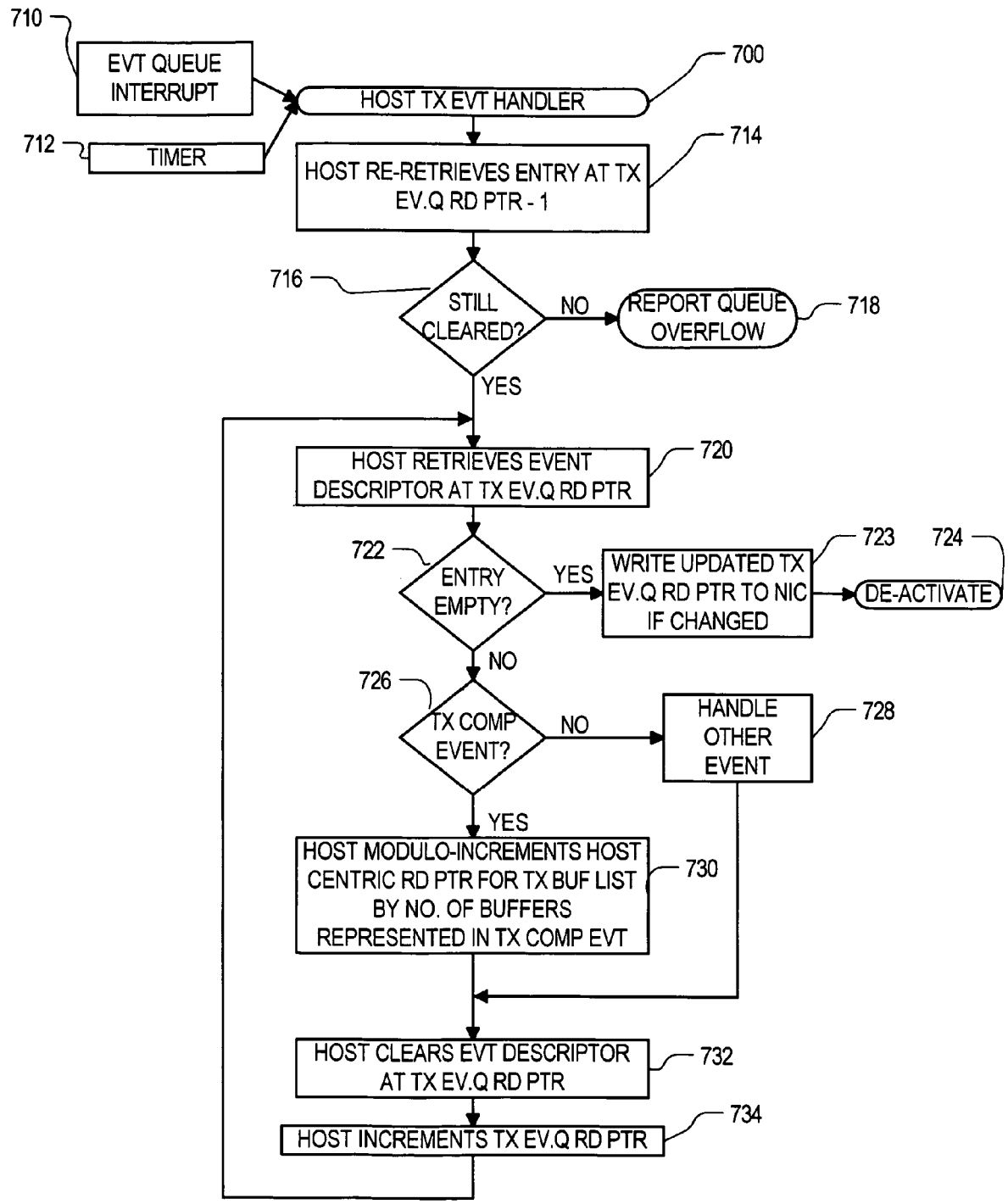

In operation, a number of different functions operate concurrently. FIGS. 5, 6 and 7 are flowcharts illustrating functions that take place for transmitting data using the structures of FIG. 3. As with all flow charts herein, it will be appreciated that many of the steps in these flowcharts can be combined, performed in parallel or performed in a different sequence without affecting the functions achieved. Also, although the functions are described herein as taking place in different "modules", it will be appreciated that an actual implementation need not be "modularized" in the same way, if at all.

In FIG. 5, the host transmit event management module receives an indication from higher level software that one or more new buffers in transmit data buffers 310 are ready for sending (step 510). The module also may be activated periodically on expiration of a polling loop or timer (step 512). Typically the timing of when to push transmit buffers and how many to push at once are decisions made on the basis of external factors not important for an understanding of the present invention. They are not pushed merely whenever higher level software has filled a transmit buffer.

In step 514, in order to guarantee that the transmit event queue 318 not overflow, the host subsystem 214 determines the amount of space currently available in the transmit event queue 318. The host subsystem 214 will not queue more data buffers for transmit than can be accommodated in the transmit event queue 318 by the maximum number of transmit completion events that would be generated. In general, the maximum number of data buffers that the host subsystem 214 will queue for transmit is given by $B*(x-z)-y$, where x is the total number of entries in the transmit event queue 318; z is a predetermined maximum number of events of other types that might be written into the event queue 318, such as management events; y is the number of transmit data buffers previously queued and still outstanding; and B is the minimum number of transmit data buffers that can be represented by each transmit completion event in transmit event queue 318.

The value of x, the total number of entries in the transmit event queue 318, in one embodiment is predetermined and fixed. In another embodiment, the host subsystem 214 can determine and modify the transmit event queue size x in dependence upon such factors as how fast events can be generated given the data rate on the network 212, and based on how quickly the host subsystem 214 can handle events received.

The value of z, in one embodiment, is a predetermined maximum number of management events that NIC 216 is permitted to write into transmit event queue 318 without being cleared. Preferably z is given by the total number of management event sources in NIC 216, it being assumed that each source can assert no more than one event without being cleared; additional events from that source are either lost or held. More generally, z is the sum of $E_i$, $i=1 \ldots s$ where s is the number of management event sources, and $E_i$ (for $i=1 \ldots s$) is the maximum number of events that each i'th one of such sources can have outstanding at any given point in time.

B, the minimum number of transmit data buffers that can be represented by each transmit completion event in transmit event queue 318, in one embodiment is unity (B=1). That is, each transmit data buffer transferred to the NIC 216 generates a single corresponding transmit completion event. In another embodiment, each transmit completion events always implicitly represent a fixed number of transmit data buffers greater than 1, for example 64; in this case B is that fixed number. Each set of B transmit data buffers transferred to the NIC 216 generates one corresponding transmit completion event in such an embodiment. In yet a third embodiment, each transmit completion event represents a variable number of transmit data buffers completed, but not more than a predetermined maximum nor less than a predetermined minimum; in this case B is that minimum number. The transmit completion event itself indicates the number of transmit data buffers that it represents. Even in this third embodiment, B can be as small as 1.

In a preferred embodiment, B is programmable by the host subsystem 214, and is thereafter fixed. This embodiment is much more like the "fixed" embodiment above than it is like the variable embodiment, since the number of transmit data buffers represented by a transmit completion event is constant and both the host and the NIC know what it is. None of the complexities of the variable embodiment arise.

The value of y, the number of transmit data buffers previously queued and still outstanding, is determined not based on any comparison of transmit event queue read and write pointers, but based on historical knowledge by the host subsystem 214 of the number of transmit event queue entries that the host subsystem has previously "authorized" the NIC 216 to write and historical knowledge by the host subsystem of the number of such transmit event queue entries that the host subsystem has "consumed". The host "authorizes" the NIC 216 to write transmit-event queue entries by the act of instructing the NIC 216 to transmit data. The host issues such instructions by pushing transmit data buffer descriptors (which also can be thought of as DMA commands) into the transmit buffer list 312. Thus the host's historical knowledge of the number of transmit event queue entries previously "authorized" the NIC 216 to write is determinable from the number of data buffers that it previously queued for transmit. In particular, the number of transmit event queue entries previously authorized is equal to 1/B times the number of transmit data buffers that it previously queued for transmit. The host's historical knowledge of the number of transmit event queue entries that the host subsystem has "consumed" is simply 1/B times the number of transmit data buffer transfers represented by transmit completion events actually received into the transmit event queue 318—but only in an embodiment in which the number of transmit data buffers that are represented by each transmit completion event is fixed. In this case the host subsystem 214 determines y as the number of transmit data buffers that it previously queued for transmit, less B times the number of transmit completion events actually received into the transmit event queue 318. In an embodiment, y is determined by modulo-subtracting the host centric transmit buffer list read pointer 316 from the host centric transmit buffer list write pointer 314.

In an embodiment in which the number of transmit data buffers that are represented by each transmit completion event is variable, the host's historical knowledge of the number of transmit event queue entries that the host subsystem has consumed is not determinable from any fixed number of transmit data buffer transfers represented by transmit completion events actually received into the transmit event queue 318. Another mechanism is used in that case to make this determination.

After determining the amount of space currently available in the transmit event queue 318, in step 516 the host subsystem 214 determines a number 'M', being the lesser of the number of transmit data buffers ready and the minimum number of transmit data buffers that can be represented by transmit completion events in the space available in the transmit event queue 318 as determined in step 514.

In step 518, it is determined whether M is greater than or equal to some minimum threshold. In one embodiment, the threshold is 1, meaning events for the transmit event queue 318 will be authorized whenever a new transmit data buffer becomes ready for transmission and any space is available in the transmit event queue 318. Authorizing events one by one may add significant additional overhead on the I/O bus 218, however, so in a more preferred embodiment, a larger number is chosen for this threshold. If M is less than the threshold, then the host transmit event queue management module 500 simply goes inactive to await the next activation event (step 530).

If M is greater than or equal to the minimum threshold, then in step 520, the host subsystem 214 "authorizes" the NIC to write M/B new transmit events into the transmit event queue 318. The authorization takes place implicitly by the writing of the ready transmit data buffer descriptors into the transmit buffer list 312, and therefore requires little or no additional overhead on the I/O bus 218. In particular, step 520 includes a step 522 in which the host subsystem 214 updates (modulo-increments) its host centric buffer list write pointer 314 by M entries. In step 524 the host subsystem 214 writes M ready transmit data buffer descriptors into the transmit buffer list 312 beginning at the entry previously (before step 522) designated by the host centric buffer list write pointer 314. The updating of the host centric buffer list write pointer precedes the queueing of M transmit data buffer descriptors in order to avoid a race condition whereby the host subsystem 214 becomes waylaid after queueing the new transmit data buffer descriptors, and the NIC 216 retrieves the transmit data buffer contents before the host 214 returns to update the write pointers. In step 526 the host subsystem 214 notifies the NIC 216 of the updated write pointer, and in step 528, the NIC 216 updates its own device centric buffer list write pointer 324. In one embodiment, steps 526 and 528 are combined into a single step in which the host subsystem 214 writes the updated write pointer into a memory mapped location of the device centric transmit buffer list write pointer 324.

In step 530, the host transmit event queue management module goes inactive to await the next activation event. It can be seen that the NIC 216 becomes aware of the availability of space in the transmit event queue 318 implicitly from the modulo difference between the device centric transmit buffer list read and write pointers 326 and 324. The NIC knows that it can write that many transmit events into transmit event queue 318 without overflowing it, because the host subsystem 214 will not write a buffer descriptor into transmit buffer list 312 unless space is already available in transmit event queue 318 to accommodate any resulting transmit completion event.

FIG. 6 is a flowchart illustrating functions initiated on the NIC 216 for transmitting data onto the network 212. The NIC transmit data module 600 is activated on a TX FIFO low watermark (LWM) condition 610. It is also activated periodically on selection by a polling loop or expiration of a timer (step 612).

In step 620, the NIC 216 first determines the number of transmit data buffer descriptors that are in the transmit buffer list 312 and ready to be retrieved. This determination is made from a modulo-subtraction of the device centric buffer list read pointer 326 from the device centric buffer list write pointer 324. The NIC is also aware of the space available in its own TX FIFO 340, from its own read and write pointers into TX FIFO 340. In step 622, the NIC determines M, the lesser of the number of transmit ready buffer descriptors and the space available in TX FIFO 340. M is thus the number of transmit data buffer descriptors that can now be copied into TX FIFO 340.

In step 626, the NIC 216 proceeds to read M buffer descriptors from the transmit buffer list 312 beginning at the entry indicated by the device centric buffer list read pointer 326. In step 628, the NIC retrieves data from the buffers in transmit data buffers 310 in host memory, as identified by the buffer descriptors. Since the retrieval of data from transmit data buffers 310 is performed by DMA via the I/O bus 218, the transmit buffer descriptors are sometimes referred to herein as DMA descriptors or DMA commands. The retrieval of the M buffer descriptors themselves also takes place by DMA via the I/O bus 218.

Note that in a different embodiment, the reading of the M buffer descriptors can be interleaved or pipelined with the reading of the transmit data rather than being performed as separate atomic steps. Note also that the retrieval of data from transmit data buffers identified by buffer descriptors already in the FIFO 340 does not await a low watermark or a threshold number of buffers to retrieve. Only the retrieval of buffer descriptors from the transmit buffer list 312 are delayed for batching; and even they are not delayed for batching if the NIC 216 has run out of data to transmit.

In step 630, the NIC updates the device centric buffer list read pointer 326. In an embodiment, the NIC 216 does not explicitly update the corresponding host centric buffer list read pointer 316, since that notification occurs implicitly or explicitly as a result of completion event delivery.

In the embodiment of FIG. 6, each transmit completion event can represent a plurality of data buffer completions. Except in certain less common situations described below, the number of data buffer completions represented by each transmit completion event is a programmable but thereafter fixed number B. The NIC 216 thus "batches" transmit completion events into one, thereby optimizing usage of the I/O bus 218. In addition, whereas in certain conventional DMA command queue implementations the discovery and reporting of a queue empty alert do not occur until the controller tries to retrieve the next DMA command and finds the queue empty, the NIC 216 instead detects and reports an alert when it believes it has used the last buffer descriptor in the transmit queue. This "last buffer retrieved" condition is combined into a single event descriptor with the last batched transmit completion event, thereby further optimizing usage of the I/O bus 218. These two optimizations are illustrated in the following steps of FIG. 6.

In particular, the NIC 216 determines in step 640 whether it believes the last transmit data buffer identified by a descriptor in the transmit buffer list 312 has been retrieved in step 628. This condition will be true if M, the number of buffer descriptors that the NIC read from the transmit buffer list in step 626, is equal to the number of transmit buffer descriptors that were in the transmit buffer list in step 620. If not, that is the NIC knows there are more transmit buffer descriptors in the transmit buffer list 312, then any transmit completion events that the NIC writes to the transmit event queue 318 at this point will not have the tx_desc_q_empty flag set.

In step 642, the NIC compares N, a value representing the number of transmit buffers that have been retrieved from host memory beyond those already reported in batched transmit completion events written previously to the transmit event queue 318, to B. If N<B, then the NIC transmit data module 600 simply goes to inactive to await the next activation event (step 644). The outstanding transmit buffer completions are merely accumulated and will not be reported to the host subsystem 214 until the next time that transmit completion events are written. On the other hand, if N>=B in step 642, then in step 646 the NIC 216 writes batched transmit completion events representing (in total) an integer multiple of B transmit data buffers, into the transmit event queue 318 beginning at the entry identified by the device centric transmit event queue write pointer. The number of batched transmit completion events written in step 646 will therefore be the integer part of N/B, and any remainder will not be reported to the host subsystem 214 until the next time such completion events are written. The transmit completion event descriptor format includes a flag 'tx_desc_q_empty' flag, but in the transmit completion events written in step 646, this flag is not set because the NIC 216 has determined (in step 640) that additional transmit buffer descriptors remain in the transmit buffer list 312.

In an embodiment, the NIC determines N=B and writes a batched transmit completion event whenever the NIC's device centric buffer list write pointer 324 is at an integer multiple of B.

Note that the NIC 216 writes transmit completion events into the transmit event queue 318 upon completion of the data transfers from host memory 222 into the transmit FIFO 340. It does not wait until the data is actually transmitted onto the network 212, since transmission errors typically are not of interest to the higher level application software. Another embodiment might not notify the host subsystem of 'transmit completion' until a subsequent step occurs in the process of transmitting data onto the network, for example completion by the network interface device of the transmission of data onto the network. As used herein, if in a particular embodiment the notification of such a downstream step implies that the NIC has completed the retrieval of data from the transmit data buffers, then such a notification is considered to "include" a step of notifying the host subsystem of completion by the network interface device of the retrieval of data from the transmit data buffers.

Returning to step 640, if the NIC 216 believes that the last transmit data buffer identified by a descriptor in the transmit buffer list 312 has been retrieved in step 628, then the NIC does not wait until N>=B before reporting transmit completion events. Instead, in step 648 the NIC writes sufficient batched transmit completion events into the transmit event queue 318, beginning at the device centric transmit event queue write pointer 332, to cover all N outstanding buffer completions. Thus N/B transmit completion events will be written in step 648 if N is an integer multiple of B, and INT(N/B)+1 transmit completion events will be written in step 648 if N is not an integer multiple of B. Whatever number of transmit completion events are written in step 648, the last one will have its tx_desc_q_empty flag set.

It will be appreciated that where N is not an integer multiple of B, the last transmit completion event are written in step 648 will represent fewer than B transmit buffer completions. Note that in one embodiment, no special notification is required for the host to know this, since the host already knows the full depth of its transmit buffer list. The host knows that each transmit completion event represents the lesser of B and the number of descriptors remaining in the transmit buffer list. In another embodiment, however, relying exclusively on the number of descriptors remaining in the transmit buffer list to determine the number of buffer completions represented by the last completion event may create a race condition, for example if the host queued more buffer descriptors into the transmit buffer list 312 after the NIC 216 last retrieved buffer descriptors from the list in step 626. In order to protect against such a race condition, the transmit completion event format also includes a field (tx_desc_ptr) in which the NIC 216 copies its device centric buffer list read pointer 326. The host can determine the number of buffer completions represented by the last completion event from the fractional part of (1/B) times the difference between the device centric buffer list read pointer as reported in the transmit completion event, and the host centric buffer list read pointer 316. Alternatively, the host can simply update its host centric buffer list read pointer 316 from the device centric buffer list read pointer as reported in the transmit completion event, without making a separate calculation of the number of buffer completions represented by received transmit completion events.

In various embodiments, other conditions aside from transmit descriptor queue empty condition might also cause the NIC to write a transmit completion event covering fewer than B transmit buffers. One such other condition might be completion of a transmit queue flush operation. For each such condition, a mechanism is provided to enable the host subsystem to know which descriptors in the transmit buffer list 312 are covered by the batched transmit completion event. Also in various embodiments, other repeating events other than data transfer completion events might also be batched. Example candidates include (without limitation) events notifying the host subsystem of various configuration completion operations, such host commands to update entries in a buffer descriptor table 1310, described below.

If any transmit completion events are written into the transmit event queue 318 in either step 646 or 648, then in step 634 the NIC 216 correspondingly updates its own transmit event queue write pointer. The updating of the device centric transmit event queue write pointer 332 in step 634 might cause an interrupt to be generated (step 636) to activate the host transmit event handler, discussed with respect to FIG. 7. As can be seen from the logic in FIG. 3, if the device centric transmit event queue write pointer 332 was previously equal to the device centric transmit event queue read pointer 344, then the updating in step 634 will cause the comparator 346 output to transition to an active state. If the interrupt enable bit 348 is active when this occurs, then the interrupt generator 352 will generate the interrupt. If the read and write pointers were previously unequal when the updating in step 634 occurs, then no new interrupt will be generated because the comparator 346 output will already be in the active state. Note that the updating of write pointer 332 can in certain circumstances cause the comparator 346 to transition to an inactive state, in particular if the write pointer had wrapped around and is about to overtake the read pointer. But this is not a situation that logic 350 needs to handle since, as described hereinafter, the algorithm is designed such that the interrupt enable bit 348 will always be inactive should that occur.

After step 636, the NIC transmit data module 600 deactivates (step 644).

As mentioned, the NIC 216 knows that it can write into transmit event queue 318 in repetitions of step 632 whatever number of transmit completion events are required to represent the completion of M transmit data buffers, even without reference to the device centric transmit event queue read pointer 344. The NIC 216 knows this because the host subsystem 214 will not have written a buffer descriptor into transmit buffer list 312 unless space was already available in transmit event queue 318 for sufficient numbers of transmit completion events to represent completion of all outstanding transmit data buffers.

Also as mentioned, the NIC does not explicitly notify the host subsystem 214 of an updated transmit event queue write pointer value, since the host does not maintain a local version of a transmit event queue write pointer. The host determines space available in the transmit event queue 318 not from comparing a local read and write pointer into the transmit event queue 318, but by comparing the host centric read and write pointers 316 and 314 into the transmit buffer list 312 as previously described.

FIG. 7 is a flow chart illustrating pertinent functions of a host transmit event handler module 700. Module 700 is activated either on receipt of an interrupt (step 710), generated in step 636 (FIG. 6), or on selection periodically by a polling loop or expiration of a timer (step 712).

Preliminarily, the host transmit event handler implements a failsafe mechanism to ensure that the host subsystem 214 and NIC 216 are operating properly with respect to the state of the transmit event queue 318. In particular, at creation time, all entries in the transmit event queue 318 are initialized to a "cleared state" value. In one embodiment the cleared state is zero, but in another embodiment a different indication of a cleared state can be used. An event descriptor written into the event queue 318 will differ from the cleared value. Whenever an event is retrieved from the event queue 318 and handled, the host subsystem 214 writes the cleared state value into that entry of the event queue. Subsequently, before handling a subsequent event, the host subsystem 214 re-retrieves the value from the entry just handled and checks that it is still in the cleared state. If it is not, then the NIC 216 has or is about to overflow the transmit event queue 318. This should never occur if the host subsystem 214 and the NIC 216 are SW are both accurately following the protocol described herein, but in certain embodiments this failsafe mechanism is desirable.

Accordingly, in step 714, the host subsystem 214 first retrieves the event descriptor at the location in the transmit event queue 318 just before the one currently designated by the event queue read pointer 320. This is the location in transmit event queue 318 from which the last-handled event was retrieved. In step 716, it is determined whether the event descriptor remains in its cleared state. If not, then a queue overflow condition is reported (step 718).

If the re-retrieved event descriptor remains in its cleared state, then in step 720, the host subsystem 214 retrieves the event descriptor at the location in the event queue designated by the transmit event queue read pointer 320. If this new event is in the cleared state (step 722), then the transmit event queue 318 is not yet empty. In step 726, it is determined whether the new event is a transmit completion event. In one embodiment transmit event queue 318 cannot contain any events other than transmit completion events, but in another embodiment it can. Thus if the current event is something other than a transmit completion event, such as a management event, then it is handled in step 728.

If the current event is a transmit completion event, then depending on the embodiment, it may indicate completion of the data transfer for either a fixed or variable number of transmit data buffers. In either case, in step 730, the host subsystem 214 modulo-increments the host centric buffer list read pointer 316 for the transmit buffer list 312 by the number of buffers represented in the current transmit completion event. This is the mechanism by which the host subsystem 214 learns that the NIC 216 has updated its own device centric buffer list read pointer 326. In an embodiment, however, the NIC may specify its updated device centric buffer list read pointer 326 explicitly in the transmit completion event. The latter mechanism may be used either instead of or in addition to the former.

Also in step 730, once the host has incremented the host centric buffer list read pointer 316 beyond a particular transmit data buffer descriptor, it also releases the identified transmit buffer back into a pool. Eventually, after the buffer has been re-filled with new data by higher level software, the host will re-write the data buffer descriptor into the transmit buffer list 312 to queue it again for transmission via the NIC 216.

In step 732, the host subsystem 214 clears the event descriptor at the location in transmit event queue 318 identified by the current transmit event queue read pointer, for the reasons previously explained, and in step 734 the host subsystem 214 modulo-increments the transmit event queue read pointer 320. The module then loops back to step 720 to retrieve the next event descriptor, and so on until a cleared entry is retrieved and the module goes inactive (step 724).

If in step 722 it is determined that the retrieved next event descriptor is cleared, then the transmit event queue 318 contains no more events for handling at this time. In one embodiment, the host transmit event handler 700 would then simply go inactive to await the next activation trigger (step 724). At least for queue depth management purposes, there is no need for the host subsystem 214 to notify the NIC 216 of the updated host centric transmit event queue read pointer since the NIC avoids overflowing transmit event queue 318 not by comparing a local read and write pointer into the transmit event queue 318, but by not having been authorized (by the host) to write more event descriptors into the transmit event queue 318 than can be accommodated by the space then available as previously described.

In a preferred embodiment, however, the host memory subsystem does so notify the NIC 216 as a means of managing event queue interrupts as described in more detail hereinafter. Accordingly, in step 723, if the host centric transmit event queue read pointer 320 has changed, then the host writes the updated pointer value into the NIC's device centric transmit event queue read pointer. The host transmit event handler 700 then goes inactive in step 724.

Receive Queue Operation, Simplified Embodiment

Figure 8:
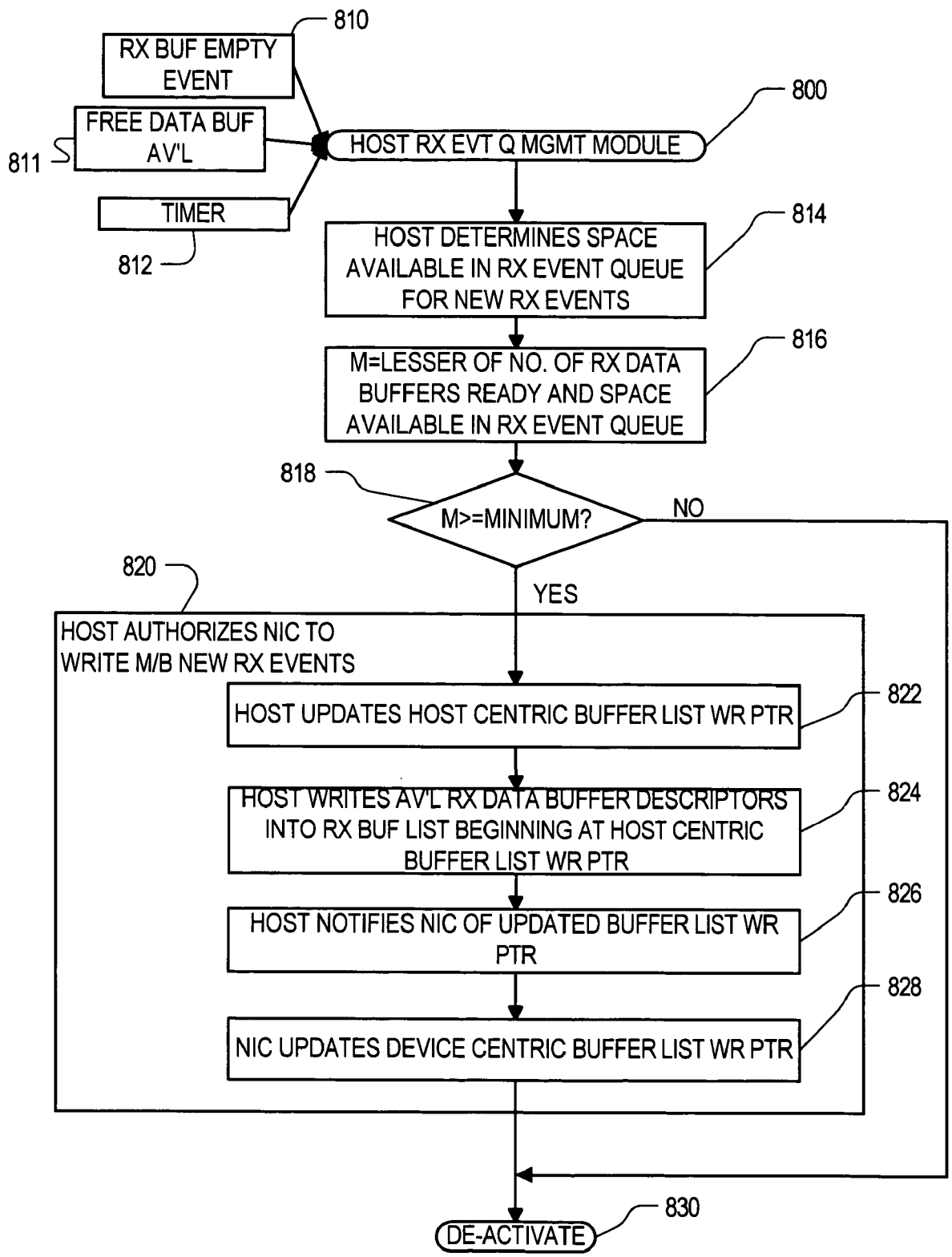
FIGS. 8-11 and 15 are flowcharts illustrating functions that take place for using the structures of FIG. 4.

FIGS. 8-11 are flowcharts illustrating functions that take place for receiving data using the structures of FIG. 4. Receive queue operation is similar in many respects to transmit queue operation as described above, so some aspects of the operation already described will be omitted here. In FIG. 8, the host receive event management module receives an indication from higher level software that a new data buffer in receive data buffers 410 is empty and available for receiving data (step 811). The module is also activated in response to receipt by the host of a receive buffer list empty event as described hereinafter (step 810). The module also may be activated periodically on expiration of a polling loop or timer (step 812). In step 814, the host subsystem 214 determines the amount of space currently available in the receive event queue 418. As with the transmit event queue 318, the timing of when to push receive buffers depends primarily on external factors not important to an understanding of the present invention. The host subsystem 214 will push as many receive buffers onto the receive buffer list 412 as requested according to these factors, but limited, in the manner described herein, so as to guarantee that the receive event queue 418 will not overflow. The host subsystem 214 therefore will not queue more data buffers for receive data than can be accommodated in the receive event queue 418 by the number of receive completion events that would be generated. In general, the maximum number of data buffers that the host subsystem 214 will queue for receive data is given by $B*(x-z)-y$, where x is the total number of entries in the receive event queue 418, z is a predetermined maximum number of events of other types that might be written into the event queue 418, y is the number of receive data buffers previously queued and still outstanding, and B is the minimum number of receive data buffers that can be represented by each receive completion event in receive event queue 418.

The values of x, y, z and B can be constructed similarly, in various embodiments, to those described above with respect to operation of the transmit queue. They need not have the same values. Specifically with respect to y, the number of receive data buffers previously queued and still outstanding, this value is determined not based on any comparison of receive event queue read and write pointers, but based on historical knowledge by the host subsystem 214 of the number of receive event queue entries that the host subsystem has previously authorized the NIC 216 to write and historical knowledge by the host subsystem of the number of such receive event queue entries that the host subsystem has consumed. The host's historical knowledge of the number of receive event queue entries previously authorized the NIC 216 to write is determinable from the number of data buffers that it previously queued for receive. Thus the host subsystem 214 determines y as the number of data buffers that it previously queued for receive, less the number of data buffers represented by receive completion events actually received into the receive event queue 418. In an embodiment, y is determined by modulo-subtracting the host centric buffer list read pointer 416 from the host centric buffer list write pointer 414.

After determining the amount of space currently available in the receive event queue 418, in step 816 the host subsystem 214 determines a number 'M', being the lesser of the number of data buffers available for queuing of receive data, and the minimum number of receive data buffers that can be represented by receive completion events in the space available in the receive event queue 418 as determined in step 814.

In step 818, it is determined whether M is greater than or equal to some minimum threshold. Preferably the minimum threshold is 1, but in other embodiments a larger number may be chosen for the threshold. If M is less than the threshold, then the host receive event queue management module 800 simply goes inactive to await the next activation event (step 830).

If M is greater than or equal to the minimum threshold, then in step 820, the host subsystem 214 "authorizes" the NIC to write MIB new receive events into the receive event queue 418. The authorization takes place implicitly by the writing of the ready receive data buffer descriptors into the receive buffer list 412, and therefore requires little or no additional overhead on the I/O bus 218. In particular, step 820 includes a step 822 in which the host subsystem 214 updates (modulo-increments) its host centric buffer list write pointer 414 by M entries. In step 824 the host subsystem 214 writes M available receive data buffer descriptors into the receive buffer list 412 beginning at the entry previously (before step 822) designated by the host centric buffer list write pointer 414. As on the transmit side, the updating of the host centric buffer list write pointer precedes the queueing of M receive data buffer descriptors in order to avoid a race condition whereby the host subsystem 214 becomes waylaid after queueing the new receive data buffer descriptors, and the NIC 216 writes the receive data into these buffers before the host 214 returns to update the write pointers. In step 826 the host subsystem 214 notifies the NIC 216 of the updated write pointer, and in step 828, the NIC 216 updates its own device centric buffer list write pointer 424. In one embodiment, steps 826 and 828 are combined into a single step in which the host subsystem 214 writes the updated write pointer into a memory mapped location of the device centric receive buffer list write pointer 424.

In step 830, the host receive event queue management module goes inactive to await the next activation event. It can be seen that the NIC 216 becomes aware of the availability of space in the receive event queue 418 implicitly from the modulo difference between the device centric read and write pointers 426 and 424 into the receive buffer list 412. The NIC knows that it can write that many receive events into receive event queue 418 without overflowing it, because the host subsystem 214 will not write a buffer descriptor into receive buffer list 412 unless space is already available in receive event queue 418 to accommodate any resulting receive completion event.

Figure 9:
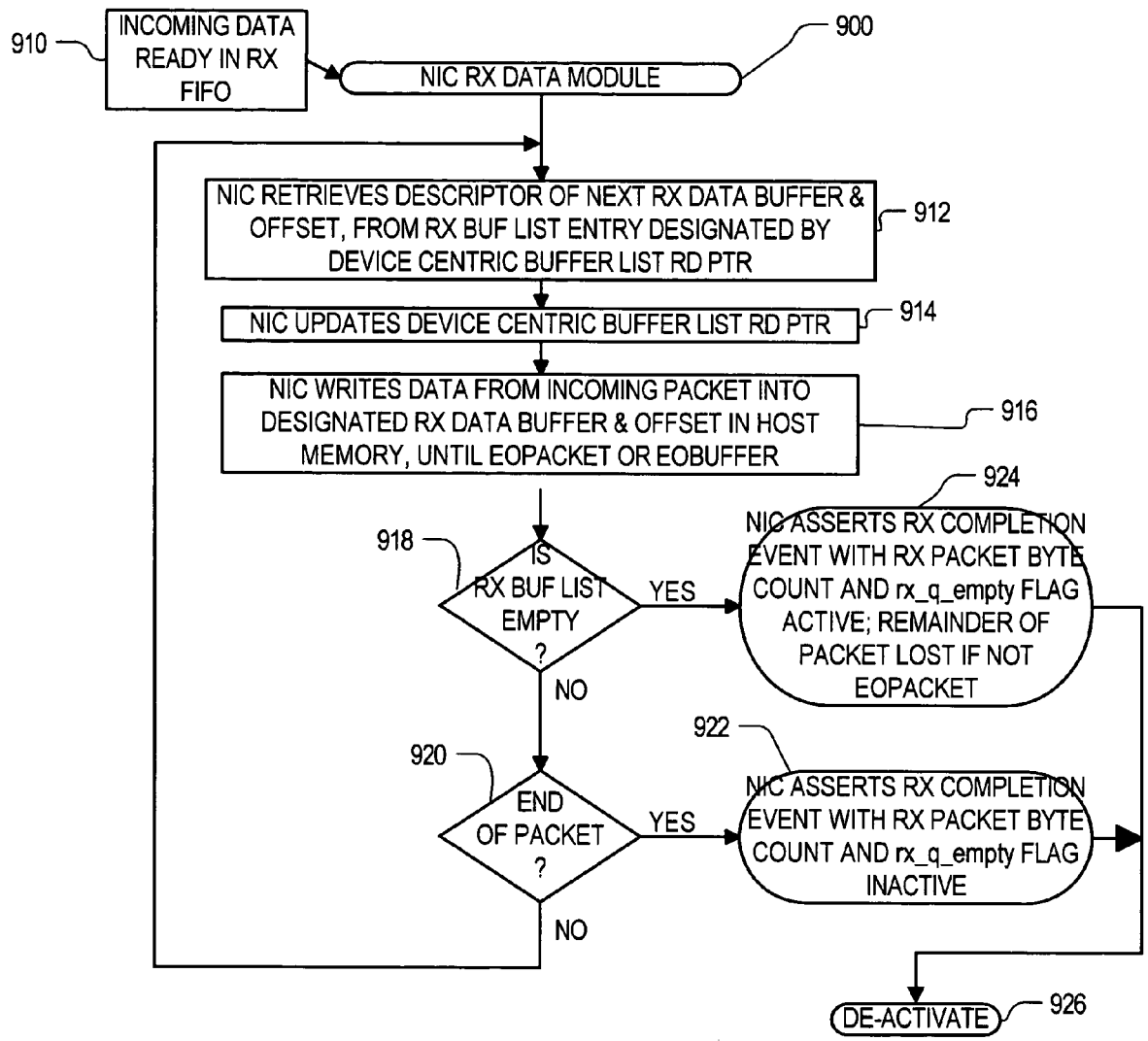

FIG. 9 is a flowchart illustrating functions initiated on the NIC 216 upon receipt of data from the network 212. The incoming data is placed into the RX FIFO 440, and when a high water mark is reached, the NIC receive data module 900 is activated (step 910). Unlike on the transmit side, the NIC 216 does not batch a fixed number of receive data buffer completions into each receive completion event. In one embodiment, however, it does wait to assert a single receive completion event upon completion of a packet, even if the packet occupies more than one receive data buffer.

In step 912, the NIC 216 retrieves the descriptor of the next receive data buffer and offset from the entry of the receive buffer list 412 designated by device centric buffer list read pointer 426. In step 914, the NIC 216 updates (modulo-increments) its device centric buffer list read pointer. The NIC does not at this time notify the host 214 of the new read pointer since that notification will occur implicitly or explicitly through event delivery as described below.

In step 916, the NIC 216 writes data from the incoming packet into the receive data buffer designated by the retrieved descriptor, beginning at the specified offset. Writing continues by DMA until either the end of the current data buffer is reached or the end of the incoming data packet is reached, or both.

As on the transmit side, the NIC 216 detects and reports a queue empty alert when it believes it has retrieved and used the last buffer descriptor in the receive queue. This alert is combined into a single event descriptor with the receive completion event, thereby further optimizing usage of the I/O bus 218.

In particular, the NIC 216 determines in step 918 whether it believes it has used the last receive buffer identified by a descriptor in the receive buffer list 312. The NIC can determine this by comparing its device centric buffer list read pointer 426 to its device centric buffer list write pointer 424. If not, that is the NIC knows there are more receive buffer descriptors in the receive buffer list 412, then no alert is necessary and in step 920, the NIC determines whether end-of-packet has been reached. If not, then the NIC receive data module 900 returns to step 912 to retrieve the descriptor for the next receive data buffer. No event is asserted to indicate Receive Data Buffer Full in this embodiment. The host 214 will become aware of which receive data buffers are full based on the receive data buffers identified consecutively in the receive buffer list 412, beginning at the host-centric RX queue read pointer.

If step 920 determines that end-of-packet was reached, then in step 922 the NIC 216 asserts a receive completion event to cover all the receive data buffers that contain data from the packet. As on transmit, the receive completion event descriptor format includes a receive descriptor queue empty flag ('rx_desc_q_empty'), but in the receive completion event written in step 922, this flag is not set because the NIC 216 has determined (in step 918) that additional receive buffer descriptors remain in the receive buffer list 412. Note that in this embodiment, only one receive completion event will be asserted even if the packet data spans multiple buffers in receive data buffers 410. Multiple buffers are chained together by consecutive entries in the receive buffer list 412. Note also that if end-of-packet does not coincide with the end of a receive buffer, then the remaining space in the buffer is left unused.

Returning to step 918, if the NIC 216 believes that the last receive data buffer identified by a descriptor in the receive buffer list 412 has been retrieved in step 912, then the NIC does not wait until end-of-packet before reporting the receive completion event. Instead, in step 924 the NIC asserts a receive completion event to cover all the receive data buffers that contain data from the packet. In this receive completion event the rx_desc_q_empty flag is set. If packet data remains in the NIC's RX FIFO 440 when this occurs, it is lost. The host subsystem 214 can detect packet data loss by comparing the receive packet byte count field in the receive completion event descriptor, which always contains the byte count of the full packet, with the number of bytes in the receive data buffers covered by the receive completion event. As on the transmit side, the host (in one embodiment) knows that the receive data buffers covered by the receive completion event are those identified by the descriptors in the receive buffer list 412, beginning with the entry pointed to by the host centric buffer list read pointer 416 and ending before the entry pointed to by the host centric buffer list write pointer 414. In another embodiment, a race condition similar to that described above with respect to the transmit side can be avoided by including an additional field, in the receive completion event descriptor format, to contain a copy of the device centric buffer list read pointer 426 as updated by the NIC 216 in step 914. The host can then determine the receive data buffers covered by the receive completion event as those identified by the descriptors in the receive buffer list 412, between the host centric buffer list read pointer 416 and the device centric buffer list read pointer as reported in the receive completion event.

In yet another embodiment, the NIC supports more than one network port. Receive completion event batching is more difficult in such an embodiment, since the NIC may fill receive buffers discontiguously relative to the order they were placed into the receive buffer list 412. That is, the NIC may fill the buffer identified by receive descriptor N with a partial packet from network port 1, then fill the buffer identified by receive descriptor N+1 with a complete packet from network port 2. Further data from the network 1 packet would go into a subsequent data buffer. If receive completion events were to be batched in this embodiment, then the NIC might assert the completion event for the packet from network port 2 before asserting the completion event for the packet from network port 1. If the NIC's receive completion event for the packet from network port 2 were to include the its updated receive buffer list read pointer to indicate the last descriptor used, and if a receive completion event were to indicate completion of all the data buffers identified by the descriptors in the receive buffer list 412, beginning with the entry pointed to by the host centric buffer list read pointer 416 and ending with the entry pointed to by the device centric receive buffer list read pointer in the receive completion event descriptor, then the host might erroneously believe that both the buffer identified by receive descriptor N and the buffer identified by receive descriptor N+1 contain data from the same packet.

In order to avoid this situation, this embodiment does not batch receive completion events. Receive completion events do not indicate completion of more than one receive data buffer. This embodiment supports both standard size data packets, in which data packets have a relatively small maximum length and the receive data buffers are at least as large as the maximum data packet length, and "jumbo" data packets, in which a data packet can be longer and can span more than one data buffer. A given receive queue is either in standard mode or jumbo mode. If the queue is in standard mode, then absent an error, every receive data buffer filled will contain an end-of-packet, so no receive completion event will indicate completion of more than one data buffer and the problem will not arise. If the queue is in jumbo mode then it is still the case that no receive completion event will indicate completion of more than one data buffer, since the NIC writes a receive completion event for each data buffer it fills. The receive completion event format includes a "RX_Jumbo_Cont" bit which the NIC sets in order to notify the host subsystem that the subject data buffer does not contain an end-of-packet (i.e. there will be a continuation buffer). This embodiment therefore does not batch receive completion events. The receive completion event still includes a copy of the NIC's updated device centric receive buffer list read pointer 426, which now points to the specific descriptor from the receive buffer list 412 for whose data buffer the event indicates completion. The receive completion event format also indicates the NIC port number from which the packet was received.

Returning to the FIG. 9 embodiment, after both steps 924 and 922, once the NIC has asserted a receive completion event, the NIC receive data module 900 then returns to an inactive state (step 926).

Figure 10:
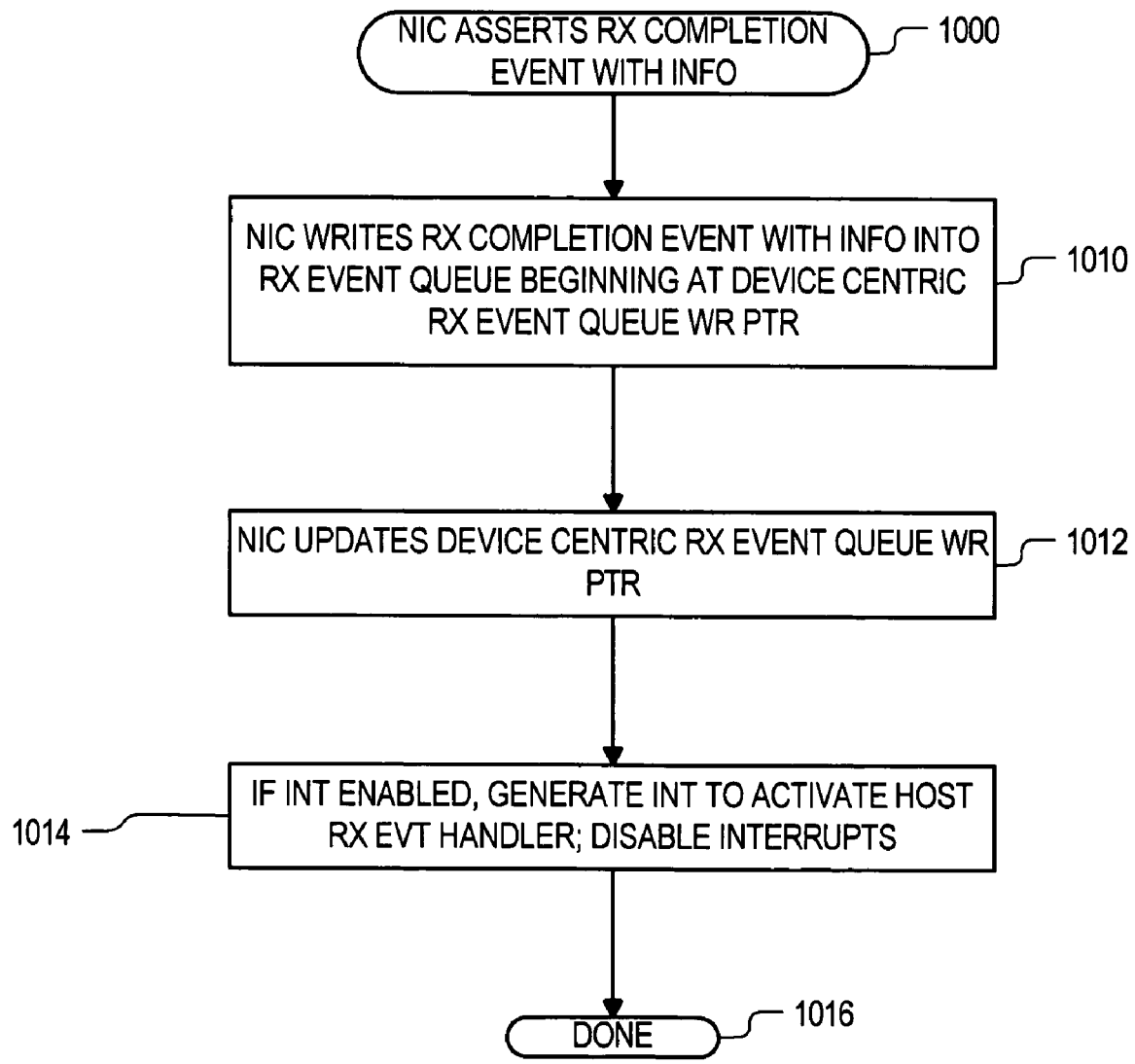

In both steps 924 and 922, the NIC asserts a receive completion event containing certain information. FIG. 10 is a flowchart detail of this step. In step 1010, the NIC 216 writes the receive completion event into the receive event queue 418 beginning at the entry identified by the device centric receive event queue write pointer. In step 1012, NIC 216 correspondingly updates its own receive event queue write pointer. As mentioned, the NIC 216 knows that it can write into receive event queue 418 whatever number of receive completion events are required to represent the completion of M receive data buffers, even without reference to the device centric receive event queue read pointer 444. The NIC 216 knows this because the host subsystem 214 will not have written a buffer descriptor into receive buffer list 412 unless space was already available in receive event queue 418 for sufficient numbers of receive completion events to represent completion of all outstanding receive data buffers.

Also as mentioned, the NIC does not explicitly notify the host subsystem 214 of an updated receive event queue write pointer value, since the host does not maintain a local version of a receive event queue write pointer. The host determines space available in the receive event queue 418 not from comparing a local read and write pointer into the receive event queue 418, but by comparing the host centric read and write pointers 416 and 414 into the receive buffer list 412 as previously described.

Figure 11:
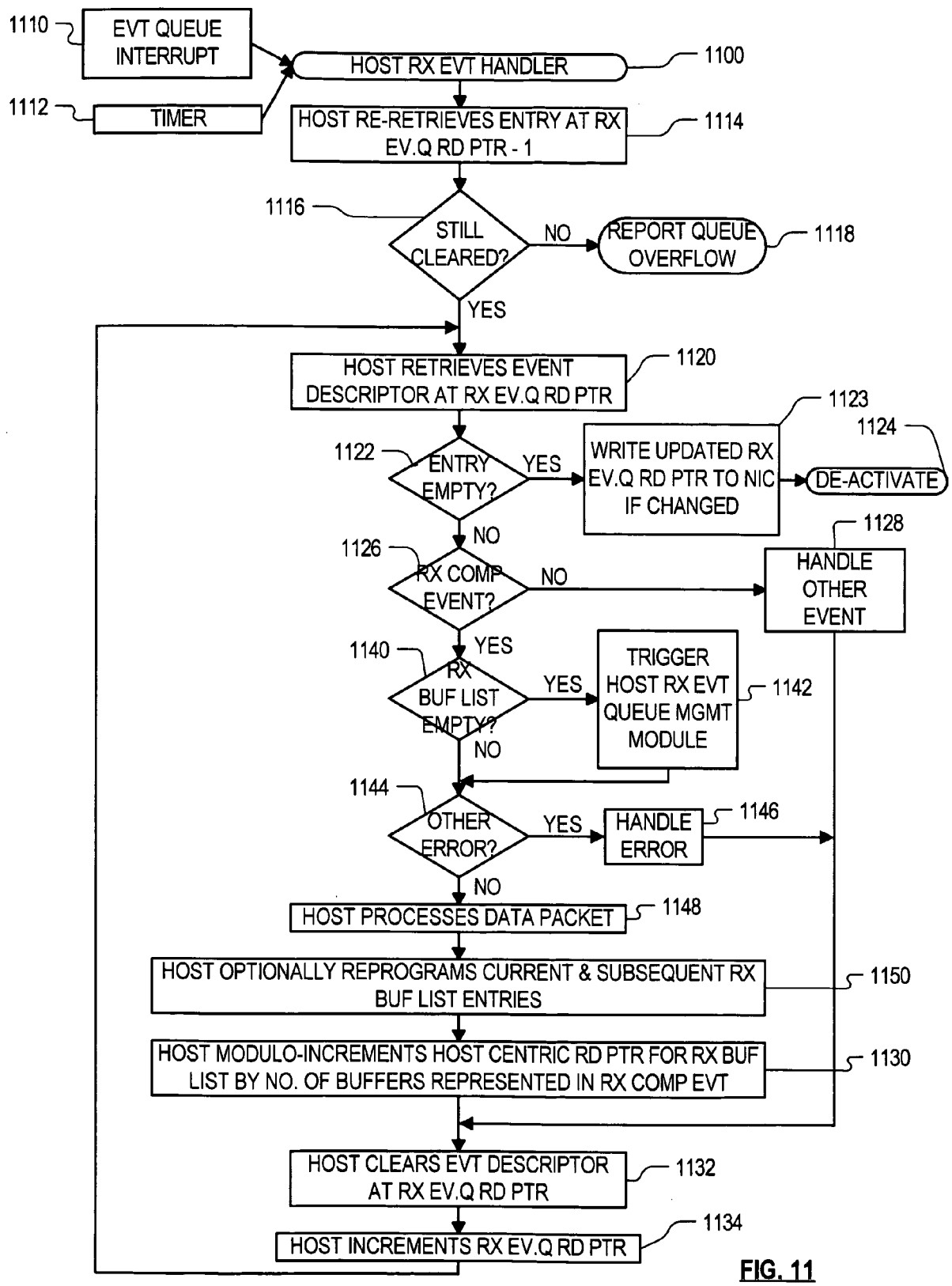

However, as on the transmit side, the updating of the device centric receive event queue write pointer 432 in step 1012 might cause an interrupt to be generated (step 1014) to activate the host receive event handler, discussed with respect to FIG. 11. As can be seen from the logic in FIG. 4, if the device centric receive event queue write pointer 432 was previously equal to the device centric receive event queue read pointer 444, then the updating in step 634 will-cause the comparator 446 output to transition to an active state. If the interrupt enable bit 448 is active when this occurs, then the interrupt generator 452 will generate the interrupt. If the read and write pointers were previously unequal when the updating in step 634 occurs, then no new interrupt will be generated because the comparator 446 output will already be in the active state. As on the transmit side, logic 450 needs to handle a situation in which the updating of write pointer 432 causes the comparator 446 to transition to an inactive state, because the algorithm is designed such that the interrupt enable bit 448 will always be inactive should that occur.

FIG. 11 is a flow chart illustrating pertinent functions of a host receive event handler module 1100. Module 1100 is activated either on receipt of an interrupt (step 1110), generated in step 1014 (FIG. 10), or on selection periodically by a polling loop or expiration of a timer (step 1112).

Initially, the host receive event handler implements the same failsafe mechanism that is implemented on the transmit side, to ensure that the host subsystem 214 and NIC 216 are operating properly with respect to the state of the receive event queue 418. Thus at creation time, all entries in the receive event queue 418 are initialized to a cleared state value. In step 1114, the host subsystem 214 retrieves the event descriptor at the location in the receive event queue 418 just before the one currently designated by the event queue read pointer 420, and in step 1116, it is determined whether the event descriptor remains in its cleared state. If not, then a queue overflow condition is reported (step 1118).

If the re-retrieved event descriptor remains in its cleared state, then in step 1120, the host subsystem 214 retrieves the event descriptor at the location in the event queue designated by the receive event queue read pointer 420. If this new event is not in the cleared state (step 1122), then the receive event queue 418 contains events for handling at this time. In step 1126, it is determined whether the new event is a receive completion event. In one embodiment receive event queue 418 cannot contain any events other than receive completion events, but in another embodiment it can. Thus if the current event is something other than a receive completion event, such as a management event, then it is handled in step 1128.

If the current event is a receive completion event, then in step 1140 the host 214 determines whether the Receive Buffer List Empty flag is set. If so, then the module (in step 1142) triggers the host receive event queue management module 800 in order to replenish the receive buffer list 412 with additional receive data buffers. In step 1144, the host 214 determines further whether any of a variety of error types are indicated by the receive completion event descriptor. If so, then in step 1146 the host 214 handles the error. Note that some of the error types included in step 1144 may actually be detected before or after the receive buffer list empty test of step 1140, some may bypass the replenishment (triggered by step 1142) of receive buffer descriptors in receive buffer list 412 for the time being, and some may bypass processing of the data packet in step 1148. The details of such error handling are not important for an understanding of the invention.

In step 1148, assuming no serious error has been detected, the host 214 processes the newly received packet data. This may require chaining together several receive data buffers in sequence as designated by consecutive receive buffer list entries. The host 214 knows the starting buffer and offset of the packet from the buffer descriptor in the receive buffer list 412 pointed to by the host centric buffer list read pointer 416, and knows the end of the packet either from the receive packet byte count identified in the receive completion event or from the copy of the device centric buffer list read pointer 426 that might be included in the receive completion event. After processing the packet data in these buffers, the host may release the buffers back into a pool for eventually re-writing into the receive buffer list 412 for re-use by different incoming packet data.

In step 1150, if the higher level software is so designed, the host subsystem 214 may reprogram the receive buffer list 412 entry pointed to by the host centric buffer list read pointer 416 with a descriptor for a new available receive data buffer, and may do the same with respect to all consecutively subsequent receive buffer list entries up to but not including the receive buffer list entry pointing to the beginning of data for the next receive packet. In step 1130, the host subsystem 214 modulo-increments the host centric buffer list read pointer 416 for the receive buffer list 412 by the number of buffers represented in the current receive completion event. As on the transmit side, this is the mechanism by which the host subsystem 214 learns that the NIC 216 has updated its own device centric buffer list read pointer 426. In an embodiment, however, the NIC may specify its updated device centric buffer list read pointer 426 explicitly in the receive completion event. The latter mechanism may be used either instead of or in addition to the former.

In step 1132, the host subsystem 214 clears the event descriptor at the location in receive event queue 418 identified by the current receive event queue read pointer, for the failsafe-related reasons previously explained, and in step 1134 the host subsystem 214 modulo-increments the receive event queue read pointer 420. The module then loops back to step 1120 to retrieve the next event descriptor, and so on until a cleared entry is retrieved and the module goes inactive (step 1124).

If in step 1122 it is determined that the retrieved next event descriptor is cleared, then the receive event queue 418 contains no more events for handling at this time. In one embodiment, the host receive event handler 1100 would then simply go inactive to await the next activation trigger (step 1124). At least for queue depth management purposes, there is no need for the host subsystem 214 to notify the NIC 216 of the updated host centric receive event queue read pointer since the NIC avoids overflowing receive event queue 418 not by comparing a local read and write pointer into the receive event queue 418, but by not having been authorized (by the host) to write more event descriptors into the receive event queue 418 than can be accommodated by the space then available as previously described.

In a preferred embodiment, however, the host memory subsystem does so notify the NIC 216 as a means of managing event queue interrupts. Accordingly, in step 1123, if the host centric receive event queue read pointer 420 has changed, then the host writes the updated pointer value into the NIC's device centric receive event queue read pointer. The host receive event handler 1100 then goes inactive in step 1124.

Interrupt Management

As mentioned, whereas one embodiment can take advantage of aspects of the invention by never updating a shadow copy of an event queue read or write pointer in the host memory subsystem 222 or on the NIC device 216, as the case may be, in another embodiment the NIC 216 does in fact maintain a device centric event queue read pointer 344 or 444 for each of the transmit and receive event queues 318 and 418. However, these read pointers are used only for interrupt management as described hereinafter; the NIC 216 does not refer to them for event queue depth management. Moreover, in one embodiment they are used for interrupt management only at the option of the host subsystem 214. For reasons described below, the host may use the device centric receive event queue read pointer 444 only, leaving the device centric transmit event queue read pointer 344 completely unused. In such an embodiment, the host never does write event queue read pointer updates into device centric transmit event queue read pointer 344 (i.e. step 723 in FIG. 7 is omitted).

Figure 15:
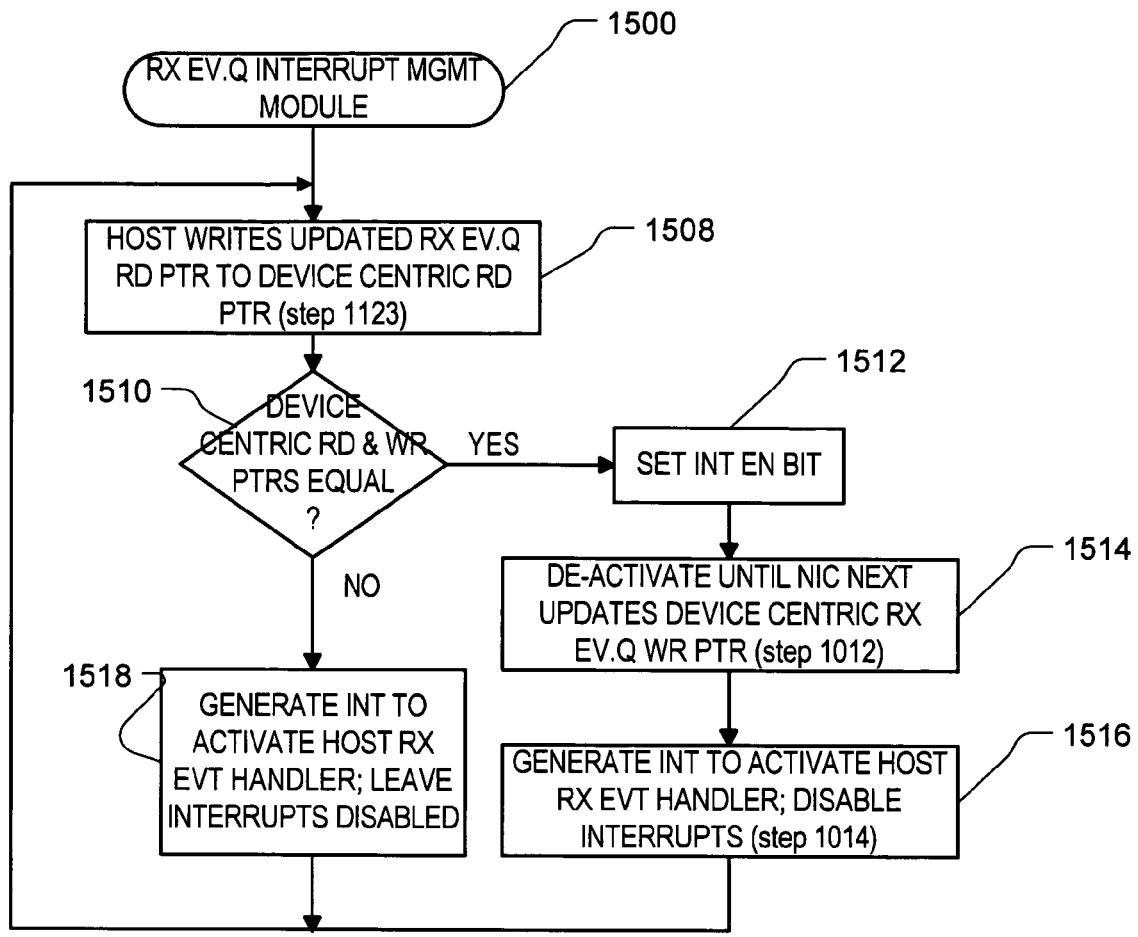

FIG. 15 is a flow chart illustrating the interaction between the host subsystem 214 and the NIC 216 for managing interrupt generation by the NIC 216 for activating the host receive event handler of FIG. 11. The interaction is designed both to minimize the number of interrupts required while also avoiding the possibility of a race condition. Some steps in FIG. 15 duplicate steps that are also part of other flow charts, but collecting them in FIG. 15 will help illustrate their relationship to interrupt management.

In the host receive event handler 1100, after handling one or more receive events that it has retrieved from the receive event queue 418, it may write an updated receive event queue read pointer into the device centric receive event queue read pointer 444 on the NIC 216 (step 1123). This step is shown as step 1508 in FIG. 15. By writing such a value, the host is indicating its view to the NIC that the receive event queue 418 is now empty. If true in the view of NIC 216, then the device centric receive event queue read and write pointers 432 and 434 will now be equal. The NIC thus compares the two values in step 1510 (by comparator 446), and if they are equal, then the NIC also re-enables interrupts for the receive event queue 418 by setting the interrupt enable bit 448 to its active state (step 1512). The re-enabling of interrupts takes place in response to and atomically with the updating of the device centric receive event queue read pointer; the writing of such updated value constitutes a single combined instruction both to update the device centric receive event queue read pointer with the new value, and also to re-enable interrupts. The receive event queue interrupt management module on the NIC 216 then goes inactive (step 1514), with interrupts enabled, until the NIC writes a new receive completion event into the receive event queue 418 (step 1010) and correspondingly updates the device centric receive event queue write pointer 432 in (step 1012). The device centric receive event queue read and write pointers 444 and 432 are now unequal, and in step 1516, since the interrupts are still enabled from step 1512, the NIC receive data module generates an interrupt to activate the host receive event handler of FIG. 11 (as set forth in step 1014). The NIC 216 also atomically disables (suppresses) further receive event queue interrupt generation by resetting interrupt enable bit 448, thereby temporarily to permit the NIC receive data module to write additional events into receive event queue 418 without generating further interrupts. The receive event queue interrupt management module then returns to step 1508, awaiting the next writing by the host of another updated receive event queue read pointer. When that occurs, as previously described, the NIC once again compares the device centric read and write pointers for equality (step 1510), and once again waits with interrupts disabled until the NIC writes another event into the receive event queue 418 (step 1514).

If in step 1510 the NIC 216 determines that the device centric event queue read and write pointers are not equal, then this indicates that the NIC 216 does not share the host's view that the receive event queue 418 is now empty. This might occur, for example, if the NIC was in the process of writing more receive completion events into the receive event queue 418 (step 1010 of the NIC receive data module) while the host was determining, in step 1122 of the host receive event handler, that the next retrieved event descriptor was empty. If this race condition occurs, then the NIC 216 will detect it by determining in step 1510 that the two pointers are not equal (i.e., the device centric receive event queue write pointer 432 is ahead of the device centric receive event queue read pointer 444). The NIC in this situation will leave interrupts disabled, and will immediately generate another interrupt to activate the host receive event handler (step 1518). This will give the host a chance to handle the event that was in process at the time it made the incorrect determination in step 1122 that the receive event queue 418 was empty.

Note that the NIC receive data module might continue to write more events into the receive event queue 418, and if the host receive event handler detects them in step 1122 they will be handled. If any of these additional events remain outstanding when the host next writes an updated receive event queue read pointer to the NIC (step 1123), then this new race condition will again be detected in step 1510 and yet another interrupt will be generated; and so on.

If the event queue interrupt management module is used on the transmit side in a particular embodiment, then the mechanisms described above with respect to the receive event queue interrupt management module (FIG. 15) are implemented similarly for transmit. However, as pointed out above, in another embodiment the interrupt management module is used only on the receive side and not on the transmit side. This is because low latency is desired on the receive side, but not as important on the transmit side. On the transmit side, reduction of interrupts may be more important than prompt receipt of transmit completion events. All the hardware described above for interrupt management can remain on NIC 216 in such an embodiment, but the host transmit event handler 700 never updates device centric transmit event queue read pointer 344. The interrupt enable bit 348 therefore never becomes active, and regardless of the output of read/write pointer comparator 346, the interrupt generator 352 never generates an interrupt. Instead, the host transmit event handler 700 is activated only on expiration of a timer or on selection by a polling loop in the device driver (step 712). This allows the host subsystem to make its own software-based decisions about when and how often to poll for new events in the transmit event queue 418, instead of being governed by NIC-generated interrupts.

In many embodiments, the enabling and disabling of interrupts in steps 1512 and 1516 need not be as gross a function as to apply to the entire peripheral device 216. The functions can be implemented by a masking mechanism, for example. In this sense the terms disablement and enablement are used herein interchangeably with terms such as masking and unmasking of interrupts, and permitting and suppressing interrupts. In addition, since the host event handler typically deactivates after writing its updated event queue read pointer to the NIC 216 (see step 1124, FIG. 11), awaiting a new interrupt to re-activate (step 1110), the writing of the event queue read pointer can also be thought of as an interrupt request. No distinction is made herein between the enablement interrupts and an interrupt request.

Multiple Queue Embodiment

The invention is especially useful in a network interface architecture in which portions of the protocol stack are located both in the operating system kernel and in the transport library for invoking directly by a user-level application. An example of such an architecture is described in U.K. Patent Application No. GB0408876A0, filed Apr. 21, 2004, entitled "User-level Stack", incorporated herein by reference. In such an architecture, numerous protocol stacks can be supported, each with its own set of transmit and receive data structures, and all assisted by functions performed in hardware on the NIC.

Figure 12:
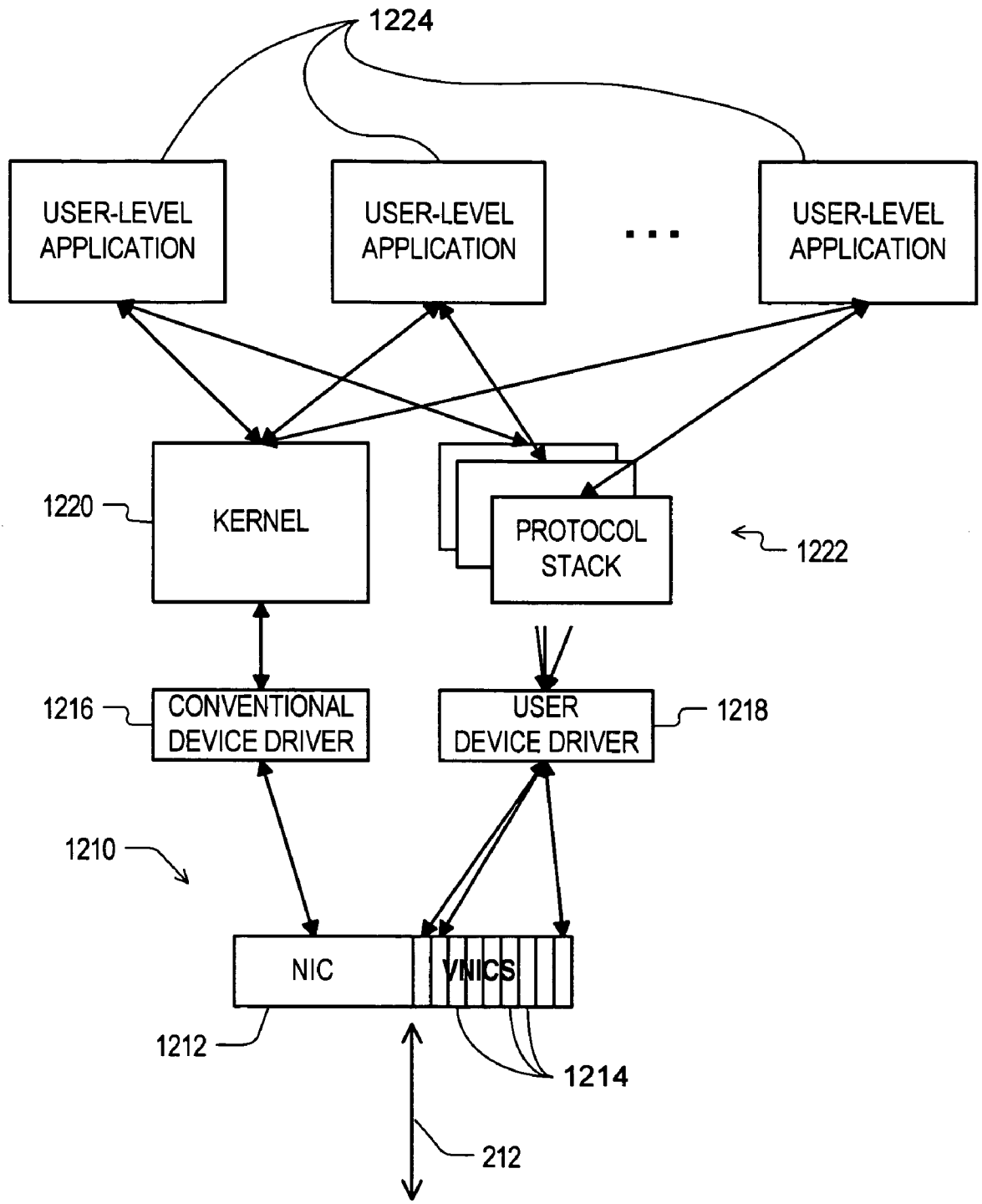
FIG. 12 is a simplified block diagram of another system incorporating aspects of the invention.

FIG. 12 is a simplified block diagram of a system in which multiple protocol stacks are supported with hardware assist on a NIC 1210. The NIC 1210 includes not only a conventional hardware NIC portion 1212, but also a plurality of "virtual" NIC portions (VNICs) 1214. The NIC 1210 appears to the operating system as a dual function device having two device drivers: a conventional device driver 1216, in communication with the conventional NIC portion 1212, and a user device driver 1218 in communication with the VNICs 1214. Generally speaking, the conventional device driver 1216 is used by the conventional protocol stack (not shown) in the kernel 1220, and the user device driver 1218 is used by each of a plurality of user level protocol stacks 1222. A separate user-specific protocol stack 1222 is created for each of a plurality of user level applications (or processes) 1224. User level applications can communicate with the network 212 via calls to the kernel 1220, but preferably they do so via their respective user level protocol stacks 1222.

The system of FIG. 12 is more complex than that of FIGS. 3 and 4, but with respect to each individual transmit or receive queue, the operation is similar. The primary difference between the two embodiments derives from the increased complexity in the FIG. 12 embodiment of keeping track of the characteristics and state of the multiple queues. Pertinent details of these differences will now be described.

Figure 13:
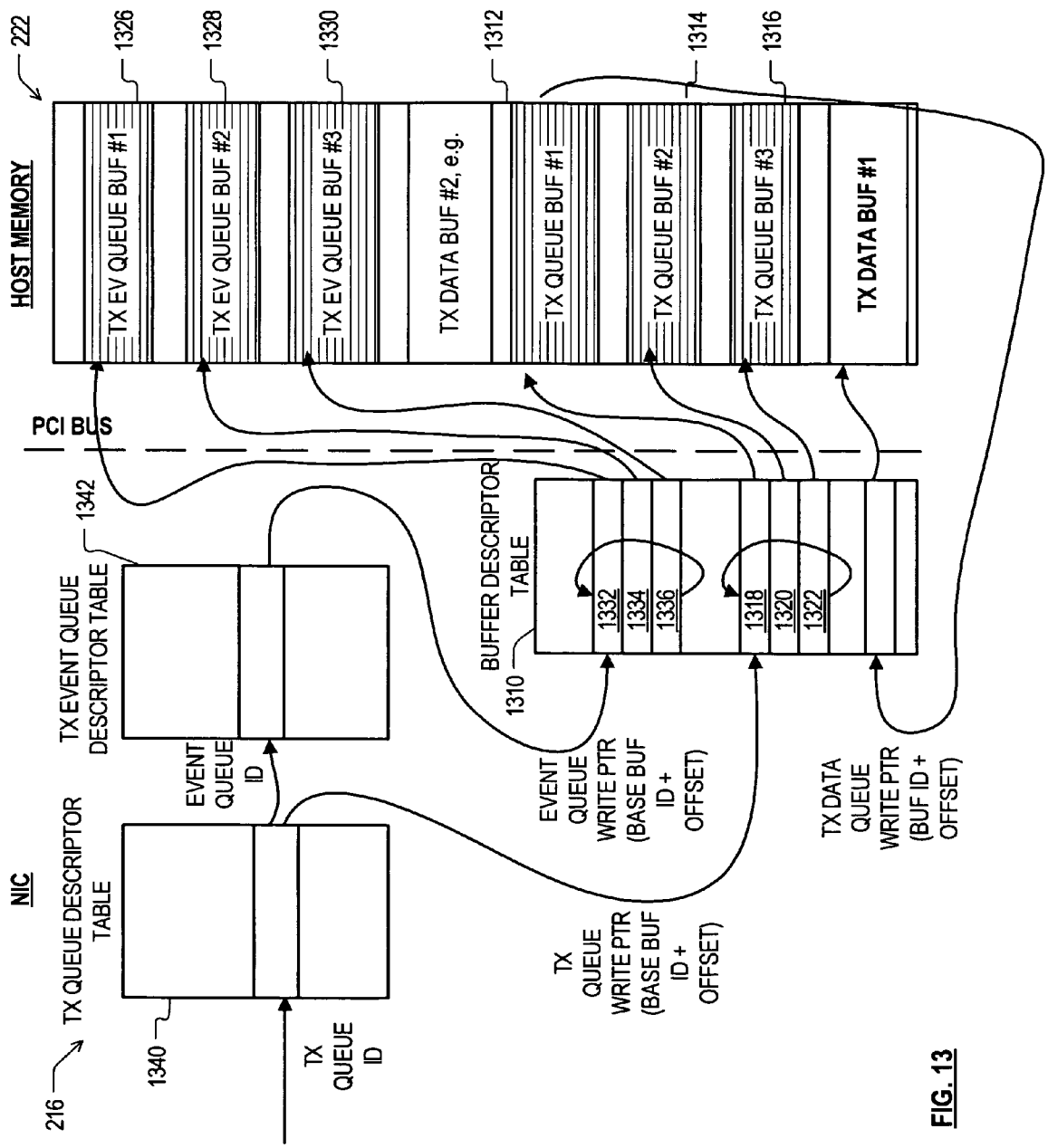
FIG. 13 is a block diagram of certain data structures used by the system of FIG. 12 in support of transmit queues.

FIG. 13 is a block diagram of various data structures used by the system of FIG. 12 in order to support separate transmit queues for each of the VNICs 1214. The diagram indicates which structures exist in host memory 222 and which exist on the NIC 216. The transmit data buffers 310, transmit buffer list 312 and transmit event queue 318 for all the transmit queues are all resident in host memory 222 and made up of generalized buffers which can be discontiguous and interspersed with each other in host memory 222. In FIG. 13, the buffers making up the transmit data buffers 310 are identified as "TX DATA BUF #n", and the buffers making up the transmit buffer list 312 are identified as "TX QUEUE BUF #n". The buffers making up the transmit event queue 318 are identified as "TX EV QUEUE BUF #n".

Individual buffers may be either 4 k or 8 k bytes long in one embodiment, and they are chained together into logically contiguous sequences by means of physically contiguous descriptors in a buffer descriptor table 1310. For example, one transmit queue (transmit buffer list 312) might occupy buffers 1312, 1314 and 1316 in host memory 222, which are discontiguous and possibly out-of-order regions of memory. They are chained together into a single logically contiguous space by the physically contiguous entries 1318, 1320 and 1322 in the buffer descriptor table 1310. The entries 1318, 1320 and 1322 are written and managed by the host 214 and are viewed as a wrap-around ring. So for example, if the host wishes to define a transmit buffer list 312 having 64 k entries for transmit data buffer descriptors, and each buffer is 4 k in size, then the host will allocate a physically contiguous sequence of 16 entries in buffer descriptor table 1310 for this transmit buffer list. Similarly, one transmit event queue 318 might occupy buffers 1326, 1328 and 1330 in host memory 222. These buffers are discontiguous and possibly out-of-order in host memory, but are chained together into a single logically contiguous wrap-around space by the physically contiguous entries 1332, 1334 and 1336 in the buffer descriptor table 1310. The buffer descriptor table 1310 is indexed by "buffer ID", and each of its entries identifies, among other things, the base address of the corresponding buffer in host memory 222.

In order to keep track of the state of each of the transmit buffer lists and transmit event queues for the many user-level applications that might be in communication with LAN 212 at the same time, the NIC 216 includes a transmit queue descriptor table 1340 and an event queue descriptor table 1342. Each transmit queue (including its transmit data buffers, its transmit buffer list and its transmit event queue) has a corresponding transmit queue ID, which is used as an index into the transmit queue descriptor table 1340. The designated entry in the transmit queue descriptor table 1340 is the starting point for describing the state and other characteristics of that particular transmit queue, as viewed by the NIC 216. Each such entry identifies, among other things:

whether the queue is a kernel queue, user queue or another kind of queue;

the size of the transmit buffer list 312 (number of transmit data buffer descriptors it can contain)

the ID of the transmit event queue associated with this transmit queue;

a queue "label" to be returned to the event queue as part of a transmit completion event;

buffer ID of base buffer in the transmit buffer list 312 for this transmit queue;

device centric read and write pointers 326 and 324 into the transmit buffer list 312 for this transmit queue In order to retrieve current transmit data from a particular transmit queue in host memory 222, the NIC 216 first uses the ID of the particular transmit queue to look up, in the transmit queue descriptor table 1340, the buffer ID of the base buffer containing the transmit buffer list 312 of the particular transmit queue. The NIC 216 also obtains from the same place, the current device centric buffer list read pointer 326 into that transmit buffer list 312. It then uses the base buffer ID as a base, and the device centric buffer list read pointer high order bits as an offset, into the buffer descriptor table 1310, to obtain the base address in host memory 222 of the buffer that contains the particular transmit buffer list 312. The NIC then uses that base address as a base, and the device centric buffer list read pointer low order bits times the number of bytes taken up per descriptor as an offset, to retrieve from host memory 222 the current entry in the particular transmit buffer list 312. Note that in order to reduce accesses to host memory 222, in one embodiment the NIC 216 caches parts of the transmit buffer lists 312.

The current entry in the particular transmit buffer list 312 contains, among other things:
   the buffer ID of the current transmit data buffer;
   a byte offset into the current transmit data buffer; and
   a number of bytes to be transmitted from the current transmit data buffer. The NIC 216 then uses the buffer ID of the current transmit data buffer as another index into buffer descriptor table 1310 to retrieve the buffer descriptor for the buffer that contains the current transmit data. Note this buffer descriptor is an individual entry in buffer descriptor table 1310; unlike the descriptors for buffers containing transmit queues or transmit event queues, this buffer descriptor is not part of a ring. The NIC 216 obtains the physical address in host memory 222 of the current transmit data buffer, and then using that physical address as a base, and the byte offset from the transmit buffer list entry as an offset, it determines the physical starting address in host memory 222 of the current data to be transmitted.

The transmit queue descriptor table 1340 entry designated by the transmit queue ID, as previously mentioned, also contains the ID of the transmit event queue associated with the particular transmit queue. All of the transmit event queues for all the applications 1224 are described by respective entries in the transmit event queue descriptor table 1342. The entry in the transmit event queue descriptor table 1342 identified by the transmit queue ID from the transmit queue descriptor table 1340 is the starting point for describing the state and other characteristics of that particular transmit event queue 318, as viewed by the NIC 216. Each such entry identifies, among other things:
   the size of the particular transmit event queue 318 (this is the value of x used in the host's calculation of the amount of space available in the transmit event queue 318);
   the buffer ID of base buffer making up the particular event queue 318;
   a char_ev_enable bit corresponding to the interrupt enable bit 348 of FIG. 3;
   the transmit event queue write pointer 332 for the particular event queue 318; and
   the transmit event queue read pointer for the particular event queue 318.

Thus in order to write an event into the transmit event queue 318 associated with a particular transmit queue, the NIC 216 uses the transmit event queue ID obtained from the respective entry in the transmit queue descriptor table 1340, to look up, in the transmit event queue descriptor table 1342, the buffer ID of the base buffer containing the transmit event queue 318 of the particular transmit queue. The NIC 216 also obtains from the same place, the current transmit event queue write pointer 332 into that transmit event queue 318. It then uses the base buffer ID as a base, and the transmit event queue write pointer high order bits times the number of bytes taken up per descriptor as an offset, into the buffer descriptor table 1310, to obtain the base address in host memory 222 of the buffer that contains the current entry of the particular transmit event queue 318. The NIC then uses that base address as a base, and the transmit event queue write pointer low order bits as an offset, to write the desired event descriptor into the current entry in host memory 222 of the particular transmit event queue 318.

Note that as illustrated in FIG. 13, whereas each slot (e.g. 1332, 1334, 1318) shown in the buffer descriptor table 1310 represents a single descriptor, each slot (e.g. 1326, 1328, 1314) in the host memory 222 represents a memory "page" of information. A page might be 4 k or 8 k bytes long for example, so if a transmit data buffer descriptor in a transmit queue occupies either 4 or 8 bytes, then each slot 1312, 1314 or 1316 as shown in FIG. 13 might hold 512, 1 k or 2 k transmit data buffer descriptors.

Figure 14:
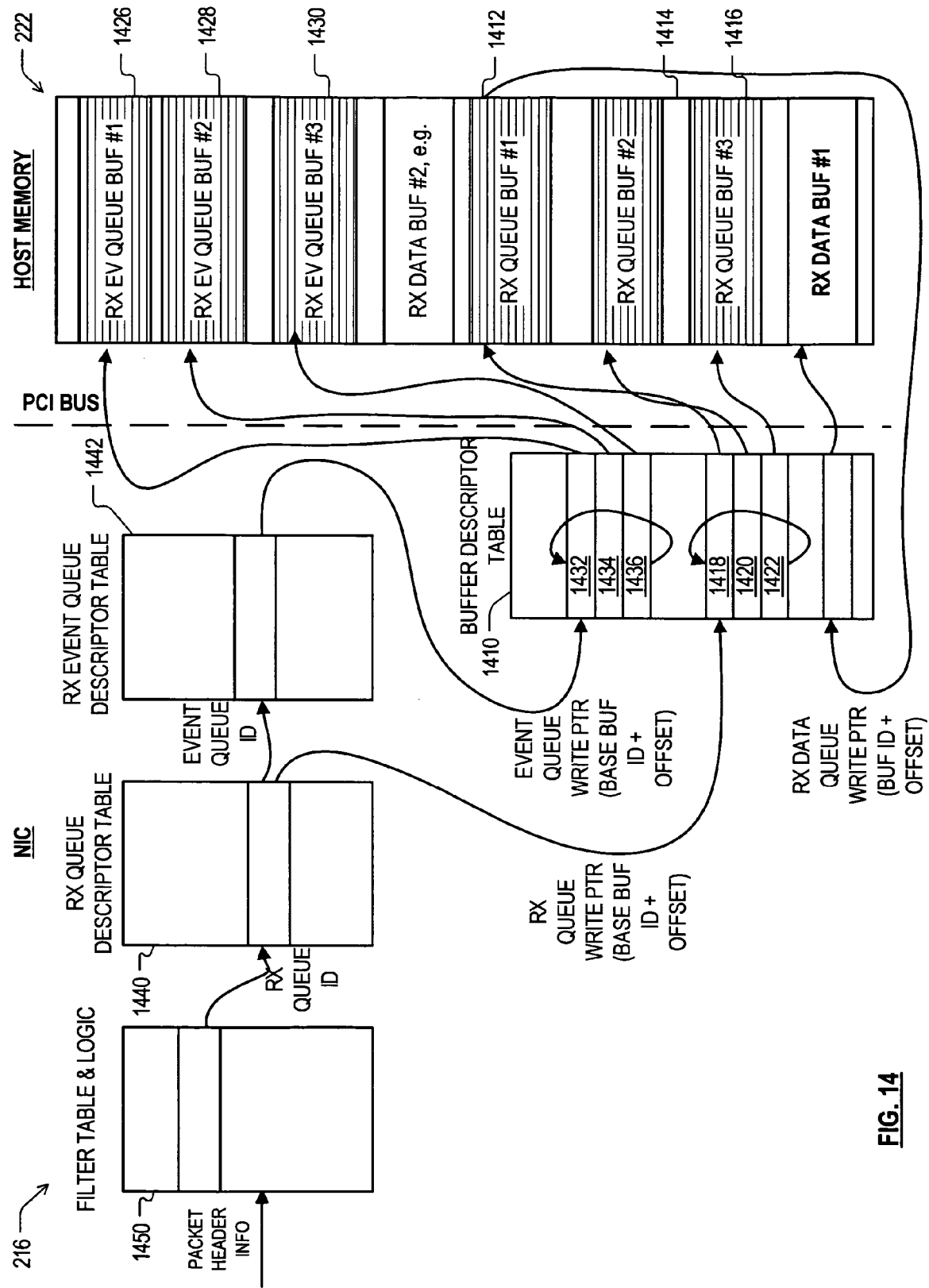
FIG. 14 is a block diagram of certain data structures used by the system of FIG. 12 in support of receive queues.

FIG. 14 is a block diagram of various data structures used by the system of FIG. 12 in order to support separate receive queues for each of the VNICs 1214. The diagram is similar to that on the transmit side, and some of the similar features will not be described here again.

As on the transmit side, the receive data buffers 410, receive buffer list 412 and receive event queue 418 for all the receive queues are all resident in host memory 222 and made up of generalized buffers which can be discontiguous and interspersed with each other in host memory 222. In FIG. 14, the buffers making up the receive data buffers 410 are identified as "RX DATA BUF #n", and the buffers making up the receive buffer list 412 are identified as "RX QUEUE BUF #n". The buffers making up the receive event queue 418 are identified as "RX EV QUEUE BUF #n". Preferably, the transmit and receive event queues 318 and 418 for all protocol stacks are combined into one overall pool of event queues. That is, preferably, the transmit and receive event queue descriptor tables 1342 and 1442 are implemented as only a single table.

Also as on the transmit side, individual buffers may be chained together into logically contiguous sequences by means of physically contiguous descriptors in a buffer descriptor table 1410. The buffer descriptor table 1410 is indexed by "buffer ID", and each of its entries identifies, among other things, the base address of the corresponding buffer in host memory 222.

In order to keep track of the state of each of the receive buffer lists and receive event queues for the many user-level applications that might be in communication with LAN 212 at the same time, like the transmit queue descriptor table 1340, the NIC 216 includes a receive queue descriptor table 1440 and an event queue descriptor table 1442. Each receive queue (including its receive data buffers, its receive buffer list and its receive event queue) has a corresponding receive queue ID, which is used as an index into the receive queue descriptor table 1440. The designated entry in the receive queue descriptor table 1440 is the starting point for describing the state and other characteristics of that particular receive queue, as viewed by the NIC 216. Each such entry identifies roughly the same information about the receive queue as described above with respect to an entry in transmit queue descriptor table 1340.

The receive queue descriptor table 1440 entry designated by the receive queue ID, as previously mentioned, also contains the ID of the receive event queue associated with the particular receive queue. All of the receive event queues for all the applications 1224 are described by respective entries in the receive event queue descriptor table 1442. The entry in the receive event queue descriptor table 1442 identified by the receive queue ID from the receive queue descriptor table 1440 is the starting point for describing the state and other characteristics of that particular receive event queue 418, as viewed by the NIC 216. Each such entry identifies roughly the same information about the receive event queue as described above with respect to an entry in transmit event queue descriptor table 1342. As on the transmit side, at least for event queue depth management purposes, this information does not need to include a device centric receive event queue read pointer for any receive event queue 418.

In addition to the structures on the receive side which correspond to those on the transmit side, the receive side also includes a filter table and logic block 1450. Because the NIC 216 can support multiple simultaneous connections between user-level applications 1224 and remote agents on LAN 212, and because the NIC 216 supports these using multiple transmit and receive queues, one function performed by the NIC 216 is to direct each incoming data packet to the correct receive queue. The mechanisms used by NIC 216 to make this determination are not important for an understanding of the invention, except to note that filter table and logic 1450 maintains a correspondence between packet header information and destination receive queue ID. The filter table and logic 1450 thus uses the header information from the incoming packet to determine the ID of the proper destination receive queue and uses that receive queue ID to index into the receive queue descriptor table 1440. As explained above with respect to the transmit side, the receive queue ID is the starting point for the NIC 216 to obtain all required information about the destination receive queue for proper forwarding of the packet data.

Management Events

As mentioned, events are used as the primary status reporting method in the embodiments described herein. Events are status words gathered from various sources in the NIC 216. Events can generate interrupts as described above with respect to the simplified embodiment, but as described below the generation of interrupts in the embodiment of FIGS. 12-14 includes an additional level of indirection. Interrupts are minimized to reduce interrupt latency and CPU overhead.

Also as mentioned, the transmit and receive event queue descriptor tables 1342 and 1442 preferably are implemented as only a single table. In one such embodiment, the unified event queue supports up to 4 k event queues. Event queues 0-3 are dedicated to a maximum of four queues used for packet transfer for a kernel network interface driver (known as the NET driver) and event queue 4 is dedicated to a second kernel driver (known as the CHAR driver) which is responsible for overall management and coordination between all the user queues and their corresponding protocol stacks.

Events are of different types, as identified by an event code field in the event descriptor. The remaining fields of the event descriptor depend on the event type. Two event types already described are transmit completion events and receive completion events; As previously described these are sent to any event queue as programmed in the transmit or receive queue descriptor table 1340 or 1440, respectively. Other event types are specific to other non-IP LAN protocols. Each event queue also has an associated timer in the NIC 216, and these timers can also generate events for their respective event queues. Certain events, including most management events, are strictly CHAR driver events. These events are sent only to the CHAR driver and not to any of the user event queues. Still other events are global events that either the CHAR driver or a kernel driver may be responsible for handling. Events can also be generated by either the CHAR driver or the NET driver. The CHAR and NET drivers can generate events of any desired type for any event queue.

The NIC 216 uses a single event FIFO (not shown) for buffering up events waiting to be written out to memory. The depth of event FIFO is small to ensure low latency delivery. When this FIFO is full, all agents get back-pressured. In addition, as events are collected from various sources, the NIC 216 in some circumstances is able to accumulate more than one into a single event descriptor. This might be the case if, for example, two different events are represented by distinct flags in a single event descriptor format. This process, referred to herein as event "coalescing", can help reduce the number of event descriptors to be written into an event queue in host memory 222. The possibility of coalescing does not reduce the value 'z' in the host subsystem's calculation of the amount of space available in an event queue for accommodating transmit or receive completion events, however, since the host cannot depend on any coalescing taking place. The host still needs to determine z as described above, in dependence upon the number of management event sources and the maximum number of events that each such source can have outstanding at any given point in time. Another embodiment might be able to assume a certain amount of coalescing, and thereby reduce the value of z.

Shared Event Queue Embodiment

In the embodiments of FIGS. 3, 4, 13 and 14, a separate event queue is shown for each of the transmit and receive data queues. In a preferred embodiment, however, the host subsystem 214 can designate a single event queue to receive events regarding a number of different data queues. The data queues assigned to a single event queue can be transmit queues, receive queues or both. For example, the host subsystem might be running a program thread that acts as an endpoint for several bundles of TCP connections on the network 212. The thread typically would have a separate transmit queue and a separate receive queue for each connection bundle, but typically would have only one event queue for receiving events related to all such transmit and receive queues. As another example, one program thread might have more than one event queue, or several program threads might share one event queue. All such variations are supported. In addition, in a multiple queue embodiment, the transmit and receive event queue descriptor tables such as 1342 and 1442 preferably are implemented as only a single table as well.

As mentioned, the entry in the queue descriptor table 1340 or 1440 for a particular data queue (transmit or receive, respectively) includes a field identifying the event queue ID into which events relevant to the particular queue should be written. When the NIC 216 consumes transmit or receive data buffers from the particular data queue, and wishes to write a completion event into the appropriate event queue, the NIC 216 retrieves the appropriate event queue ID from this field in the queue descriptor table entry for the particular data queue. The entry in the queue descriptor table for a particular data queue also includes a queue "label", which the NIC 216 will include as data in the completion event descriptor. Typically the program thread that is responsible for the particular data queue will write a code into this label field that the thread can later use (upon receiving a completion event) to identify the particular data queue ID to which the event pertains.

In a shared event queue embodiment, when the host transmit event management module determines the amount of space currently available in the associated event queue to receive completion events pertaining to the particular transmit queue, the value of z is the maximum number of events that might be written into the associated event queue from other sources including completion events pertaining to other data queues that might be written into the same associated event queue. Similarly, when the receive event management module determines the amount of space currently available in the associated event queue to receive completion events pertaining to the particular receive queue, the value of z is the maximum number of events that might be written into the associated event queue from other sources including completion events pertaining to other data queues that might be written into the same associated event queue.

Stated another way, if z is considered limited to events other than completion events, then the maximum number of data buffers that the host subsystem 214 will queue for transmit or receive at any given time is given (as set forth above) by B*(x−z)−y, where x is the total number of entries in the associated event queue and B is the minimum number of data buffers that can be represented by each completion event in the associated event queue. The value of z, however, is now the maximum number of non-completion events that might be written into the event queue, and y is the total number of data buffers previously queued and still outstanding. The value of y is the sum of $y_1, y_2, \ldots y_N$, where each $y_i$ represents the number of data buffers previously queued in a respective different one of the data queues associated with the particular event queue, and still outstanding.

Interrupt Management in Multiple Queue Embodiment

In the multiple queue embodiment, interrupts for the NET kernel queues are managed as described above with respect to the simplified embodiment. Depending on the hardware, either each kernel queue has its own interrupt or two or more of them share an interrupt. In the latter case, the shared interrupt activates all sharing drivers, each of which quickly determines whether it is the one responsible for handling the interrupt. The CHAR driver can also share an interrupt with one or more of the NET queues.

The user queues, however, are not part of the operating system and cannot receive interrupts. In an aspect of the invention, similar functions can be accomplished by the addition of one layer of indirection. In particular, in step 636 (for transmit) and 1014 (for receive), the respective NIC transmit and receive data modules do not directly interrupt the respective transmit and receive event handlers in the host. Instead, they write a "user event queue wakeup event", which includes a field identifying (by event queue ID) the event queue that requires activation, into the event queue of the CHAR driver. In the simplified embodiment, interrupts were qualified by an interrupt enable bit 348, 448; in the multiple queue embodiment, the writing of user event queue wakeup events into the event queue of the CHAR driver is qualified by the char_ev_enable bit in the event queue descriptor for the user level event queue that requires activation.

The CHAR driver queue is unlike the user level queues in the sense that it ignores its char$_{ev}$_enable bit, and is unlike the simplified embodiment in that its event queue contains wakeup events referring to another queue's driver rather than data transfer completion events (although in an embodiment the CHAR driver event queue can contain data transfer completion events as well). The CHAR driver queue is similar to the simplified embodiment in that it still includes an interrupt enable bit on the NIC. The enablement and disablement of interrupts using this bit operates substantially as set forth above with respect to FIGS. 3 and 4.

Accordingly, in conjunction with the writing of a user event queue wakeup event into the CHAR driver event queue, the NIC 216 generates an interrupt to the CHAR driver running in the host subsystem 214 only if CHAR driver interrupts are then enabled. The interrupt enable bit for the CHAR driver queue is then promptly turned off, so that further user event queue wakeup events written into the CHAR event queue will not generate interrupts. (Nor will other kinds of events written to the CHAR event queue.) Stated another way, the CHAR event queue will not generate further interrupts until the CHAR driver requests one. However the NET driver queue may still be able to generate interrupts since all interrupting event queues operate in an independent manner. As set forth above with respect to FIGS. 3 and 4, when the CHAR driver in the host believes it has emptied the CHAR driver event queue, it writes its updated host centric CHAR event queue read pointer back to the NIC 216, which compares it to the device centric write pointer to determine whether to re-enable CHAR driver interrupts (if the two pointers are equal) or assert a new interrupt (if the two drivers are unequal). A race condition, which could occur if the NIC was in the process of writing more user event queue wakeup events into the CHAR driver event queue while the CHAR driver in the host was determining that the next retrieved descriptor in the CHAR driver event queue was empty, is thereby avoided.

When the CHAR driver event handler retrieves a user event queue wakeup event from the CHAR driver event queue, it proceeds to activate the host event handler responsible for the event queue identified in the user event queue wakeup event.

There is a duality between the interrupt management mechanism used for the interrupting queues (the NET driver queues and the CHAR driver queues) and that used for non-interrupting queues (the user queues). As mentioned, the drivers for the interrupting queues enable and disable (suppress) interrupts for the particular queue whereas the drivers for the non-interrupting queues enable and disable the NIC's writing of wakeup events for the particular queue. The two processes are slightly different, in that for interrupting queues the default state is one in which interrupts will occur; they need to be suppressed during the time period that interrupts are not desired. For non-interrupting queues on the other hand the default state is one in which no wake-up events are written. A wake-up event must be requested in order for one to occur. Nevertheless, in both cases in the above-described embodiment the mechanism to enable or disable interrupts is similar to that for enabling or disabling wake-up events: they are disabled/suppressed/withheld in conjunction with the issuance of an interrupt/wake-up event, and they are re-enabled/allowed/requested by the writing of an updated event queue read pointer to the NIC. Thus no distinction is made herein among the phrases "enablement of interrupts", "allowing of interrupts", or "requesting of interrupts". Similarly no distinction is made herein among the phrases "enablement of wake-up events", "allowing of wake-up events", or "requesting of wake-up events". Even in an embodiment in which the mechanisms used for the interrupting queues are different from those used for the non-interrupting queues, no distinction is made herein among these terms.

It can be seen that the additional layer of indirection offered by sending wakeup events to a CHAR driver for coordination of interrupts permits user level queues and their drivers to operate in much the same way as the interrupting operating system queues, even though the user level drivers cannot actually receive interrupts. Even in an embodiment of multiple drivers which can receive interrupts, the additional layer of indirection is still beneficial because it helps to minimize interrupts not only for each event queue individually, but also across all the event queues generally.

The technique of a peripheral device writing an event (a "referencing" event) into an intermediary event queue, calling for the intermediary event queue handler to perform a function with respect to a different ("referenced") event queue, is not limited to wakeup events for activating the handler of a referenced queue that intentionally blocked awaiting for the wakeup event. Nor is it limited to situations in which the intermediary queue is an interrupting queue and the referenced queue is not. As an example, in one embodiment described in U.K. patent application No. 0404696.7, filed 3 Feb. 2004, entitled "Dual Driver Interface", incorporated by reference herein, a plurality of kernel event queues are supported. The peripheral device is able to detect when an event has remained on a queue (the referenced queue) for an extended period of time, indicating that the referenced queue is stuck. A queue might become stuck if for example the application, driver or transport library that was associated with that queue has failed, or has been terminated or de-scheduled. In response to such detection, instead of issuing an interrupt that is to be dealt with by the entity with which the referenced queue is associated, the network interface device issues an event (optionally with an associated interrupt) to another of the queues, preferably the queue of a control channel. This "referencing" event indicates its nature (i.e. an indication of a stuck queue) and the identity of the stuck queue. The entity associated with the control channel, which is preferably a control entity such as one of the drivers, is preferably arranged to respond to such a message by accessing and freeing the indicated queue. Many other uses of the intermediary queue technique will be apparent. Depending on the reason why the indicated queue became stuck, it may be that the handler for the now-freed event queue can then retrieve and handle one or more events on the queue.

Interrupt False Alarm Avoidance

Certain I/O buses, such as PCI 2.0 and PCI-X, support level-triggered interrupts in which the peripheral device raises an interrupt by bringing a signal line to an active state. In systems using level-triggered interrupts, a boundary condition exists which can create "false alarm" interrupts. Consider a situation in which the peripheral device raises its interrupt by bringing the interrupt signal line to its active level, and returns it to the inactive level only upon receipt of the interrupt acknowledgment from the host. If after writing the interrupt acknowledgment to the peripheral device, the host interrupt service routine exits before the peripheral device is able to de-activate the interrupt signal line, then the host may interpret the continued active signal line as a new interrupt and once again activate the event queue handler. If the event queue is still empty at that time, then this new "false alarm" interrupt will have caused a context switch by the host which was unnecessary.

In an embodiment that uses level-triggered interrupts, therefore, the likelihood of such false alarms can be minimized as follows. In response to an interrupt, the host subsystem reads a register on the NIC to determine which of a number of sources initiated the interrupt. The NIC de-activates the interrupt line in response to the host subsystem's reading of the interrupt source register. The NIC may generate further interrupts then if more events are generated after the reading of the interrupt source register, but no interrupts will be lost. Nor will the interrupt line be active at the time the host subsystem writes back its event queue read pointer, so neither will false alarm interrupts be generated.

In the multiple queue embodiments described above, a wakeup event is more akin to an edge-triggered interrupt than a level-triggered interrupt in the sense that no communication to the NIC is required to de-assert a wakeup event. There is no risk that the NIC will maintain a wakeup event active after the host event handler has deactivated itself, since the host can retire the wakeup event and deactivate itself in a coordinated manner. By its nature, therefore, assuming the event handler is designed properly, the false alarm issue need not arise in the context of wakeup events. The issue might still arise with respect to CHAR driver interrupts, however. In such a situation, one embodiment employs the false alarm prevention mechanism described above for the CHAR driver event queue and the race condition detection and remediation mechanism described above for the user event queues. In an embodiment that uses message-signaled interrupts (MSIs), as on a PCI-Express I/O bus, all queues use only the race condition mechanism described above.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information, for example by a known algorithm. In addition, the term "indicate" is used herein to mean the same as "identify".

Also as used herein, a "pointer" to a particular location in memory is information that "identifies" the particular location in memory. In one embodiment, the pointer comprises a first value that identifies an entry in a buffer descriptor table, which in turn identifies a base address of a buffer in host memory; and a second value that identifies an offset into that buffer; and may also include other parameters that are needed to identify the particular location in memory uniquely. Note that because of the definition of "identify" stated above, any read or write pointer that identifies a "next" location in a queue to be read or written, also identifies the last-read or last-written location, and vice-versa.

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the-processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for managing data transmission between a host subsystem and a network interface device, comprising the steps of:
   the network interface device retrieving data buffer descriptors from a DMA descriptor queue in the host subsystem, each of the descriptors identifying a respective data buffer in the host subsystem;
   transferring data between the network interface device and the data buffers identified by the descriptors retrieved in the step of retrieving; and
   the network interface device writing a plurality of transfer completion event descriptors into an event queue accessible to the host subsystem, each of the transfer completion event descriptors in the plurality notifying the host subsystem of completion by the network interface device of the transfer of data with at least one of the data buffers in the step of transferring data, and at least one of the transfer completion event descriptors further including within the event descriptor a notification to the host subsystem of a DMA descriptor queue empty condition.

2. A method according to claim 1, wherein the step of transferring data comprises the step of the network interface device retrieving transmit data from the data buffers identified by the descriptors retrieved in the step of retrieving, and wherein the transfer completion event descriptors notify the host subsystem of completion by the network interface device of retrieval of data from at least one of the data buffers in the step of transferring data.

3. A method according to claim 2, wherein one of the transfer completion event descriptors in the plurality of transfer completion event descriptors, notifies the host subsystem of completion by the network interface device of retrieval of data from a plurality of the data buffers in the step of transferring data.

4. A method according to claim 2, wherein each of the transfer completion event descriptors in the plurality of transfer completion event descriptors, other than the transfer completion event descriptors which also notify the host subsystem of a DMA descriptor queue empty condition, notify the host subsystem of completion by the network interface device of retrieval of data from a constant number B of the data buffers in the step of transferring data, B>1.

5. A method according to claim 4, wherein one of the transfer completion event descriptors which also notifies the host subsystem of a DMA descriptor queue empty condition, notifies the host subsystem of completion by the network interface device of retrieval of data from a number less than B of the data buffers in the step of transferring data.

6. A method according to claim 1, wherein the step of transferring data comprises the step of the network interface device writing data incoming from a network into the data buffers identified by the descriptors retrieved in the step of retrieving,
and wherein the transfer completion event descriptors notify the host subsystem of completion by the network interface device of the writing of data into at least one of the data buffers in the step of transferring data.

7. A method according to claim 6, wherein one of the transfer completion event descriptors in the plurality of transfer completion event descriptors, notifies the host subsystem of completion by the network interface device of the writing of data into a plurality of the data buffers in the step of transferring data.

8. A method according to claim 1, further comprising the step of the host subsystem writing into the DMA descriptor queue, the data buffer descriptors retrieved by the network interface device in the step of retrieving data buffer descriptors.

9. A method according to claim 1, wherein at least some of the descriptors retrieved in the step of the network interface device retrieving data buffer descriptors,
further identifies an updated host-centric write pointer into the DMA descriptor queue, further comprising the step of the network interface device including the DMA descriptor queue empty notification in the at least one transfer completion event descriptor, in response to the network interface device retrieving a data buffer descriptor from the entry in the DMA descriptor queue identified by the updated host-centric write pointer most recently received by the network interface device with respect to the DMA descriptor queue.

10. A method for managing data transmission between a host subsystem and a network interface device, comprising the steps of:
the host subsystem writing data buffer descriptors into a DMA descriptor queue, each of the descriptors identifying a respective data buffer in the host subsystem; and subsequently
the host receiving a plurality of transfer completion event descriptors in an event queue accessible to the host subsystem, each of the transfer completion event descriptors in the plurality notifying the host subsystem of completion of the transfer of data between the network interface device and at least one of the data buffers identified by the data buffer descriptors, and at least one of the transfer completion event descriptors further including within the event descriptor a notification to the host subsystem of a DMA descriptor queue empty condition.

11. A method according to claim 10, wherein at least some of the descriptors written in the step of the host subsystem writing data buffer descriptors, further identifies an updated host-centric write pointer into the DMA descriptor queue,
further comprising the step of the network interface device including the DMA descriptor queue empty notification in the at least one transfer completion event descriptor, in response to the network interface device retrieving a data buffer descriptor from the entry in the DMA descriptor queue identified by the updated host-centric write pointer most recently received by the network interface device with respect to the DMA descriptor queue.

12. A method for managing data transmission between a host subsystem and a network interface device,
wherein the host has a host-centric write pointer into a DMA descriptor queue and updates the host-centric write pointer in conjunction with the writing of additional descriptors into the DMA descriptor queue, the DMA descriptor queue being for containing descriptors identifying data buffers in the host subsystem,
the method comprising the steps of:
the network interface device retrieving data buffer descriptors from the DMA descriptor queue, each of the descriptors identifying a respective data buffer in the host subsystem, and at least some of the descriptors further identifying an updated version of the host-centric write pointer into the DMA descriptor queue;
transferring data between the network interface device and the data buffers identified by the descriptors retrieved in the step of retrieving; and
the network interface device notifying the host subsystem of a DMA descriptor queue empty condition in response to the network interface device retrieving a data buffer descriptor from the entry in the DMA descriptor queue identified by the updated host-centric write pointer most recently received by the network interface device with respect to the DMA descriptor queue.

13. A method according to claim 12, wherein the DMA descriptor queue is disposed in host memory.

14. Computing apparatus having a host subsystem, for use with a network interface device in communication with the host subsystem via a peripheral bus, the host subsystem comprising:
a plurality of data buffers;
a DMA descriptor queue, the DMA descriptor queue having a plurality of data buffer descriptors each identifying a respective one of the data buffers; and
an event queue having a plurality of data transfer completion event descriptors, each of the data transfer completion event descriptors notifying the host subsystem of completion by the network interface device of the transfer of data with at least one of the data buffers, and at least one of the transfer completion event descriptors further including within the event descriptor a notification to the host subsystem of a DMA descriptor queue empty condition.

15. Computing apparatus having a host subsystem, for use with a network interface device in communication with the host subsystem via a peripheral bus, the host subsystem comprising:
   a plurality of data buffers;
   a DMA descriptor queue, the DMA descriptor queue having a plurality of data buffer descriptors each identifying a respective one of the data buffers;
   a host-centric write pointer into a DMA descriptor queue, the host updating the host-centric write pointer in conjunction with the writing of additional descriptors into the DMA descriptor queue; and
   at least some of the descriptors further identifying an updated version of the host-centric write pointer into the DMA descriptor queue.

* * * * *